(12) United States Patent
Barney et al.

(10) Patent No.: US 7,809,756 B2
(45) Date of Patent: Oct. 5, 2010

(54) PROVIDING FILE MANAGEMENT OF BACKUP DATA STORED ON ONE OR MORE REMOVABLE STORAGE MEDIA

(75) Inventors: Rock D. Barney, Ft. Collins, CO (US); Keith Schwols, Ft. Collins, CO (US); Ellen M. Nelson, LaPorte, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1456 days.

(21) Appl. No.: 10/860,255

(22) Filed: Jun. 3, 2004

(65) Prior Publication Data
US 2004/0220899 A1 Nov. 4, 2004

Related U.S. Application Data

(63) Continuation of application No. 09/767,099, filed on Jan. 22, 2001, now Pat. No. 6,751,604, which is a continuation-in-part of application No. 09/225,522, filed on Jan. 6, 1999, now Pat. No. 6,212,512.

(51) Int. Cl.
*G06F 7/00* (2006.01)

(52) U.S. Cl. .................. 707/793; 707/797; 707/805; 717/170

(58) Field of Classification Search ......... 707/200–204, 707/100, 101, 104.1, 10; 711/170, 114, 154, 711/4, 112, 161–162
See application file for complete search history.

(56) References Cited

U.S. PATENT DOCUMENTS

| | | | |
|---|---|---|---|
| 5,335,323 A | | 8/1994 | Kolnick |
| 5,388,196 A | | 2/1995 | Pajak et al. |
| 5,438,674 A | * | 8/1995 | Keele et al. ............ 707/204 |
| 5,455,926 A | * | 10/1995 | Keele et al. ................ 711/4 |
| 5,544,360 A | | 8/1996 | Lewak et al. |
| 5,550,976 A | * | 8/1996 | Henderson et al. ........ 707/10 |
| 5,557,732 A | | 9/1996 | Thompson |
| 5,592,596 A | * | 1/1997 | Balsom ................. 358/1.18 |
| 5,634,032 A | * | 5/1997 | Haddock ................ 711/112 |
| 5,634,124 A | | 5/1997 | Khoyi et al. |
| 5,644,766 A | * | 7/1997 | Coy et al. ............... 707/204 |
| 5,671,420 A | * | 9/1997 | Bell et al. .............. 707/204 |
| 5,680,559 A | * | 10/1997 | Chew et al. ............. 715/762 |
| 5,689,662 A | * | 11/1997 | Nakajima et al. ........ 715/765 |
| 5,736,983 A | * | 4/1998 | Nakajima et al. ........ 715/762 |
| 5,751,281 A | | 5/1998 | Hoddie et al. |
| 5,761,655 A | * | 6/1998 | Hoffman .................. 707/4 |

(Continued)

*Primary Examiner*—John E Breene
*Assistant Examiner*—Anh Ly

(57) ABSTRACT

A data protection system that integrates a database with Windows Explorer in the Microsoft Windows 9X and NT Environments that mimics the Windows Explorer user interface, enabling the user to apply already known use paradigms. The data protection system appears as an extension to Windows Explorer and visibly appears as a folder item called the data vault. The data vault is a virtual disk that represents the underlying database. The database creates records and stores information about files backed up to removable secondary storage medium. Files may be backed up manually or automatically. A schedule can be set up for automatic protection of selected files and file types. The database can be searched to find files for restoration purposes without having to load secondary storage medium. Once a file or files are selected, the data protection system indicates which labeled removable secondary storage medium must be loaded for retrieval.

15 Claims, 19 Drawing Sheets

U.S. PATENT DOCUMENTS

| | | | |
|---|---|---|---|
| 5,794,001 A | 8/1998 | Malone et al. | |
| 5,799,141 A | 8/1998 | Galipeau et al. | |
| 5,831,606 A * | 11/1998 | Nakajima et al. | 715/841 |
| 5,838,319 A * | 11/1998 | Guzak et al. | 715/854 |
| 5,838,322 A * | 11/1998 | Nakajima et al. | 715/846 |
| 5,844,551 A * | 12/1998 | Nakajima et al. | 715/762 |
| 5,852,441 A * | 12/1998 | Nakajima et al. | 715/866 |
| 5,864,853 A | 1/1999 | Kimura et al. | |
| 5,884,298 A * | 3/1999 | Smith et al. | 707/2 |
| 5,917,492 A * | 6/1999 | Bereiter et al. | 715/854 |
| 5,973,692 A | 10/1999 | Knowlton et al. | |
| 5,987,469 A | 11/1999 | Lewis et al. | |
| 6,008,806 A * | 12/1999 | Nakajima et al. | 715/744 |
| 6,038,379 A * | 3/2000 | Fletcher et al. | 709/230 |
| 6,043,817 A | 3/2000 | Bolnick et al. | |
| 6,061,695 A * | 5/2000 | Slivka et al. | 715/513 |
| 6,073,137 A * | 6/2000 | Brown et al. | 707/104.1 |
| 6,085,262 A * | 7/2000 | Sawada | 711/4 |
| 6,092,169 A * | 7/2000 | Murthy et al. | 711/170 |
| 6,097,389 A | 8/2000 | Morris et al. | |
| 6,119,122 A | 9/2000 | Bunnell | |
| 6,147,687 A | 11/2000 | Wanderski | |
| 6,160,550 A * | 12/2000 | Nakajima et al. | 715/745 |
| 6,185,574 B1 * | 2/2001 | Howard et al. | 707/200 |
| 6,189,001 B1 * | 2/2001 | McGovern et al. | 707/100 |
| 6,199,146 B1 * | 3/2001 | Pence | 711/154 |
| 6,202,061 B1 | 3/2001 | Khosla et al. | |
| 6,212,512 B1 * | 4/2001 | Barney et al. | 707/1 |
| 6,221,869 B1 | 4/2001 | Yuan et al. | |
| 6,240,527 B1 * | 5/2001 | Schneider et al. | 714/21 |
| 6,247,020 B1 * | 6/2001 | Minard | 707/104.1 |
| 6,269,382 B1 * | 7/2001 | Cabrera et al. | 707/204 |
| 6,282,610 B1 | 8/2001 | Bergsten | |
| 6,289,426 B1 * | 9/2001 | Maffezzoni et al. | 707/204 |
| 6,360,280 B1 | 3/2002 | Jones | 719/328 |
| 6,374,266 B1 * | 4/2002 | Shnelvar | 707/204 |
| 6,437,810 B1 * | 8/2002 | Nakajima et al. | 715/804 |
| 6,448,985 B1 * | 9/2002 | McNally | 715/784 |
| 6,462,762 B1 | 10/2002 | Ku et al. | |
| 6,477,629 B1 * | 11/2002 | Goshey et al. | 707/204 |
| 6,642,946 B1 * | 11/2003 | Janes et al. | 715/854 |
| 6,678,724 B2 * | 1/2004 | Nakajima et al. | 709/219 |
| 6,684,229 B1 * | 1/2004 | Luong et al. | 707/204 |
| 6,686,927 B2 | 2/2004 | Meier et al. | |
| 6,751,604 B2 * | 6/2004 | Barney et al. | 707/1 |
| 6,785,786 B1 * | 8/2004 | Gold et al. | 711/162 |
| 6,934,722 B1 * | 8/2005 | Goshey et al. | 707/204 |
| 7,089,502 B2 * | 8/2006 | Nakajima et al. | 715/777 |
| 2001/0005846 A1 * | 6/2001 | Barney et al. | 707/1 |
| 2002/0188758 A1 * | 12/2002 | Nakajima et al. | 709/245 |
| 2003/0076358 A1 * | 4/2003 | Nakajima et al. | 345/765 |
| 2003/0110188 A1 * | 6/2003 | Howard et al. | 707/200 |

\* cited by examiner

PROVIDING FILE MANAGEMENT OF BACKUP DATA STORED ON ONE OR MORE REMOVABLE STORAGE MEDIA

RELATED APPLICATIONS

This is a continuation of U.S. Ser. No. 09/767,099, filed Jan. 22, 2001, now U.S. Pat. No. 6,751,604, which is a Continuation-In-Part of application Ser. No. 09/225,522 filed Jan. 6, 1999, now U.S. Pat. No. 6,212,512, both hereby incorporated by reference.

TECHNICAL FIELD

This invention relates to computer systems and more particularly to data stored on computer systems. Even more particularly, the invention relates to integration of a database into file management software for protecting, tracking, and retrieving data stored on computer systems.

BACKGROUND OF THE INVENTION

Most computer users in the desktop environment employ some sort of data protection procedures and devices to protect computer system files and data files in the event of an accidental delete or overwrite of these files from the primary storage medium, which is usually the computer's hard drive. Computer data protection systems usually involve the backup of system and data files onto some sort of secondary storage device utilizing removable storage media, such as floppy disk drives, other hard disk drives, tape drives, etc. More sophisticated users may utilize automatic data protection devices and procedures that backup the entire system on a regular basis, allowing for a full system recovery if needed.

In many cases, however, computer users employ only manual backup procedures for data files and some system files on an inconsistent basis. This is because many users find the cost of automatic backup systems to be prohibitive. Others find the performance of automatic backup systems to be lacking, especially when trying to restore one file or a particular version of a file. Many users complain that finding and retrieving a backup file is very time consuming and difficult to do. Some also find that an automatic backup system does not lend itself very well to an unscheduled manual backup of a particular file or group of files. Many users are only interested in backups of their current data files rather than backups for system files or for a full system recovery. Other users do not want to take the time to learn a backup system's methods and procedures. Still others do not want to spend the time it takes to manually backup their data and system files, and fail to backup at all.

Recent research indicates that 70-80% of those who have purchased a compact disk device, such as a CD-R drive, are today using the device for performing simple data backup manually, even if they originally purchased the drive for another purpose. Simple data backup refers to backup of the user's data, and sometimes executable programs, as opposed to backup for the purposes of full system recovery. This use is obvious in light of the storage capability of the CD medium and the speed at which data can be transferred to and from it.

However, even with the increased storage capacity and speed of such disks, restoring a backup file to the hard drive involves shuffling disks in and out of the CD drive until the right disk is located that contains the desired file or files. This can be quite time consuming, especially if the user has a number of disks and does not have a listing of what files are on each disk. In addition, if a file is backed up in a number of different versions, which may also be on different disks, the user has to check for the date, time, or size of the file in addition to the file name to find the right version.

Thus, there is a need in the art in the desktop environment today for a simple and efficient automatic data protection system directed toward protecting current data or executable files that utilizes CD-R (Recordable) drives and CD-RW (Re-Writeable) drives. There is a further need in the art for a data protection system that has a simple, intuitive user interface that does not require the user to learn a whole new method and procedure. There is also a need in the art for a data protection system that allows for both manual and automatic data backup. There is a further need in the art for a method of off-line browsing of data stored on removable storage media that does not require the shuffling of the media in and out of the storage device. There is also a need in the art for a method that will indicate which removable storage medium to insert in the storage device in order to restore a particular file. The present invention meets these and other needs in the art.

DISCLOSURE OF THE INVENTION

It is an aspect of the present invention to provide a simple and efficient data protection system which utilizes a database and a secondary storage device with removable storage media.

It is another aspect of the invention to utilize an already familiar user interface for file management software for the data protection system.

Yet another aspect of the invention is to provide for both manual and automatic data protection.

Still another aspect of the invention is to find files stored on a secondary storage device by utilizing existing user interfaces that do not require the shuffling of removable storage media in and out of the secondary storage device.

A further aspect of the invention is to identify which of possibly many individual removable storage medium should be inserted into the secondary storage device in order to restore the desired data or files from the individual removable storage medium to the primary storage medium.

A still further aspect of the invention is to allow retrieval of a file based on date, time, file type, or content in a natural and logical manner.

The above and other aspects of the invention are accomplished in a data protection system that integrates a database with Windows Explorer file management software in the Microsoft Windows® 9X and NT operating system environments. This integration appears to a user as if the data protection system is just another component of Windows Explorer and the operating system.

The data protection system is integrated into Windows Explorer such that the functionality naturally expected by the user working in this environment is maintained. Changes to the Windows Explorer menu system and tool bar are minimized to make the integration of the data protection system with Windows Explorer as unobtrusive as possible. The data protection system appears as an extension to Windows Explorer. The database appears as a folder item in the Windows Explorer, referred to as the data vault folder item. Though the data vault folder item appears to be no different from the other storage entities accessible from the left pane of the Windows Explorer window, the data vault folder item is in reality a virtual disk that represents the database, not an actual physical disk.

The database is used to record information about files backed up to removable secondary storage media utilizing the data protection system. For these backed up files, records are created in the database to track information about the file. Such tracking information includes the source directory and path of the file, including any sub-directories and folders, the name of the removable storage medium to which the files were backed up, as well as the file characteristics, such as file name, size, file type, and file date and time. The database also creates a name for the set of files backed up during the same operation, called a document set.

The underlying database supports different views of the information stored in the database. The user can configure different logical hierarchical views of the files located on removable secondary storage media. Information may be grouped and put in a hierarchy based on different dimensional criteria, such as by removable storage medium, by source drive and directory path, by document set, by folders, or by application file type. Some users may wish to browse hierarchies rooted from a specific removable storage medium, while others may be more comfortable browsing a hierarchy which reflects the original source of the information. Temporal or logical views of the database at the time when a file was backed up to a removable storage medium are also available. Though the views displayed in Windows Explorer of the data vault appear to be no different from other storage entities displayed, all the data vault items displayed are virtual drives, folders, sub-directories, and files. One skilled in the art will recognize the database may be custom written, or be any one of a number of commercially available data bases, or a flat file or files.

A specific component of the data protection system, referred to as data protector, allows the user to copy files from primary storage to the data vault. The data protector is a supplement to the functionality of the database integration with Windows Explorer. The data protector consists of context menus added to the Windows Explorer user interface, and a separate data protector application program, each of which presents the user with a simple, minimal interface for selecting folders and files for protection.

Setting the schedule for automatic data protection is done through the data protector application program. This is because setting a schedule is not a natural use paradigm from within Windows Explorer. The user can select and edit an automated protection list based on folders, individual files, or wildcard file types. The user can view a summary of what data is selected, and when it is scheduled to be protected. The user can also at any time manually save selected files to secondary storage by selecting the "Protect Now" Option in the data protector application program.

Finding a file that has been stored through the data protection system is accomplished by first right clicking on the data vault folder item in the left pane of Windows Explorer, which brings up a context menu. From here, the user can select the "Find" Option, which brings up the Data Vault Find Dialog Box. An alternative way of reaching this dialog box is to select the "In Data Vault" Option from the "Find" entry in the Windows Explorer Tools Menu.

The Data Vault Find Dialog Box is modeled to match Windows Explorer in terms of look and feel. The user can find files stored in the data vault based on date, time, file name, and wildcard. The user can access the version history of a file by right clicking and selecting the "View Versions" Option on the data vault submenu. This brings up a Data Protection System Version Display Dialog Box showing when the file was protected, with date, time, and size information for each version. The file can be restored to its original directory location in the hard drive or to some other location specified by the user.

DESCRIPTION OF THE DRAWINGS

The above and other aspects, features, and advantages of the invention will be better understood by reading the following more particular description of the invention, presented in conjunction with the following drawings, wherein.

BEST MODE FOR CARRYING OUT THE INVENTION

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
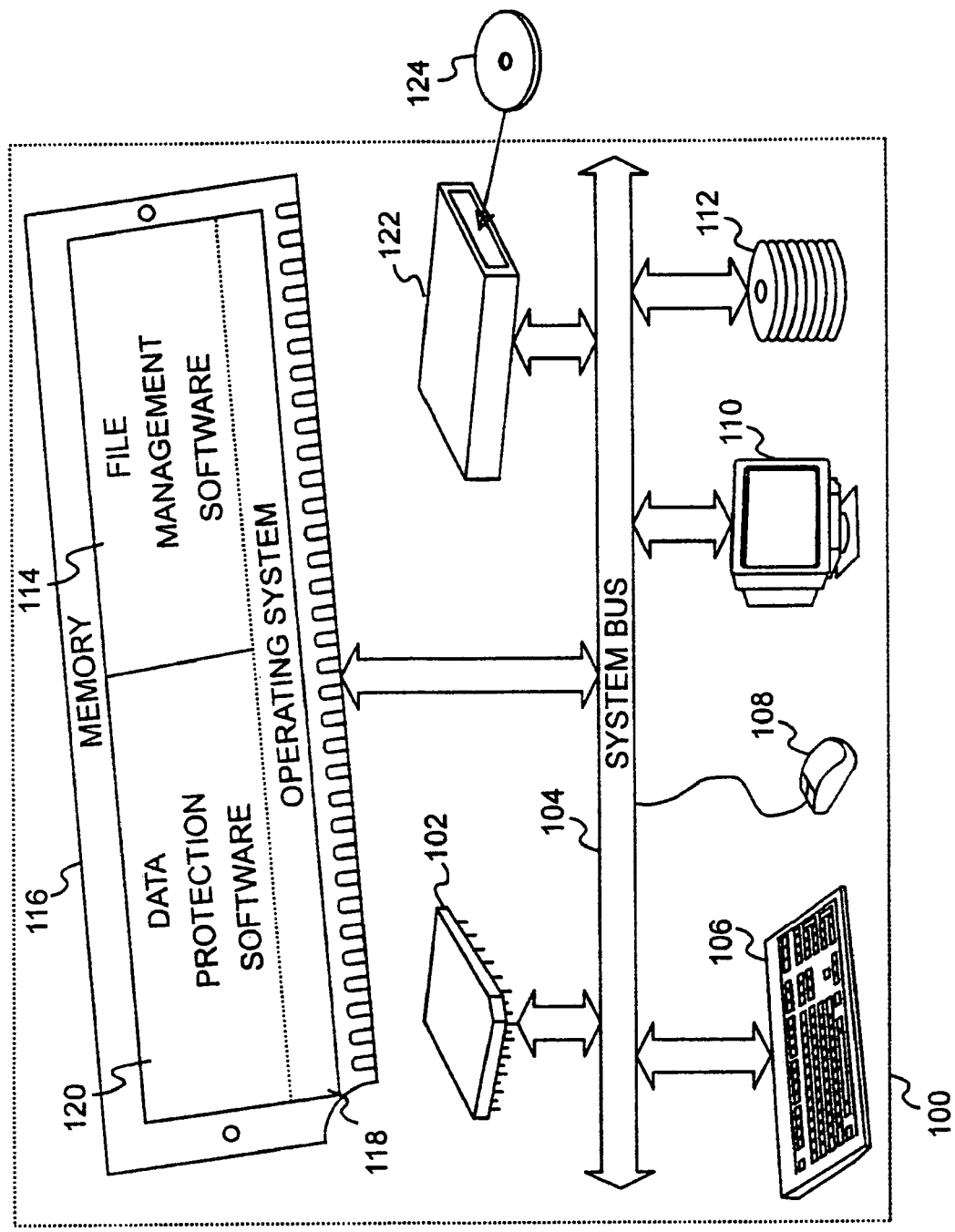
FIG. 1 shows a block diagram of a computer system containing a data protection system of the present invention.

FIG. 1 shows a block diagram of a computer system containing a data protection system of the present invention. Referring now to FIG. 1, a Computer System 100 contains a Processing Element 102. Processing Element 102 communicates to other elements of Computer System 100 over a System Bus 104. A Keyboard 106 allows a user to input information into Computer System 100 and a graphics display device 110 allows Computer System 100 to output information to the user. A Graphical Input Device 108, usually a mouse, is also used to input information, and a Primary Storage Device 112, usually a local hard disk, is used to store data and programs within Computer System 100. Primary Storage Device 112 also stores a database of the present invention. A Secondary Storage Device 122 attached to System Bus 104 receives one or more Removable Storage Medium 124. In the preferred embodiment of the invention, the secondary storage device is a CD-R or CD-RW drive with removable CDs for data storage. One skilled in the art will recognize that the data protection system will work with other types of secondary storage devices, such as floppy disk drives, tape drives, other hard disk drives, etc. A Memory 116, also attached to System Bus 104, contains an Existing Operating System 118, Existing File Management Software 114, and Data Protection Software 120 of the present invention. In the preferred embodiment of the invention, Existing Operating System 118 is the Windows Operating System, and Existing File Management Software 114 is the Windows Explorer application which is standard for Windows 9x and NT platforms for viewing and modifying a computer's file system. It is through Windows Explorer that Data Protection Software 120 integrates its functionality and makes that functionality appear to the user as just another component of the already Existing File Management Software 114.

Data Protection Software 120 exposes a database, stored on Primary Storage Device 112, that is tracking copies of files (and related versions) that have been written to Removable Storage Media 124. Though the Removable Storage Media 124 may be off line, the user can browse the contents of all Removable Storage Media 124 used to protect files as if they were present on the on line portion of the file system. When Data Protection Software 120 is installed on Computer System 100, it will add a desktop icon to Existing File Management Software 114 to represent the files on the Removable Storage Media 124 being tracked—hereafter referred to as the data protection system domain. The data protection system of the present invention includes Data Protection Software 120, the database stored on Primary Storage Device 112, Secondary Storage Device 122, and Removable Storage Media 124.

Figure 2:
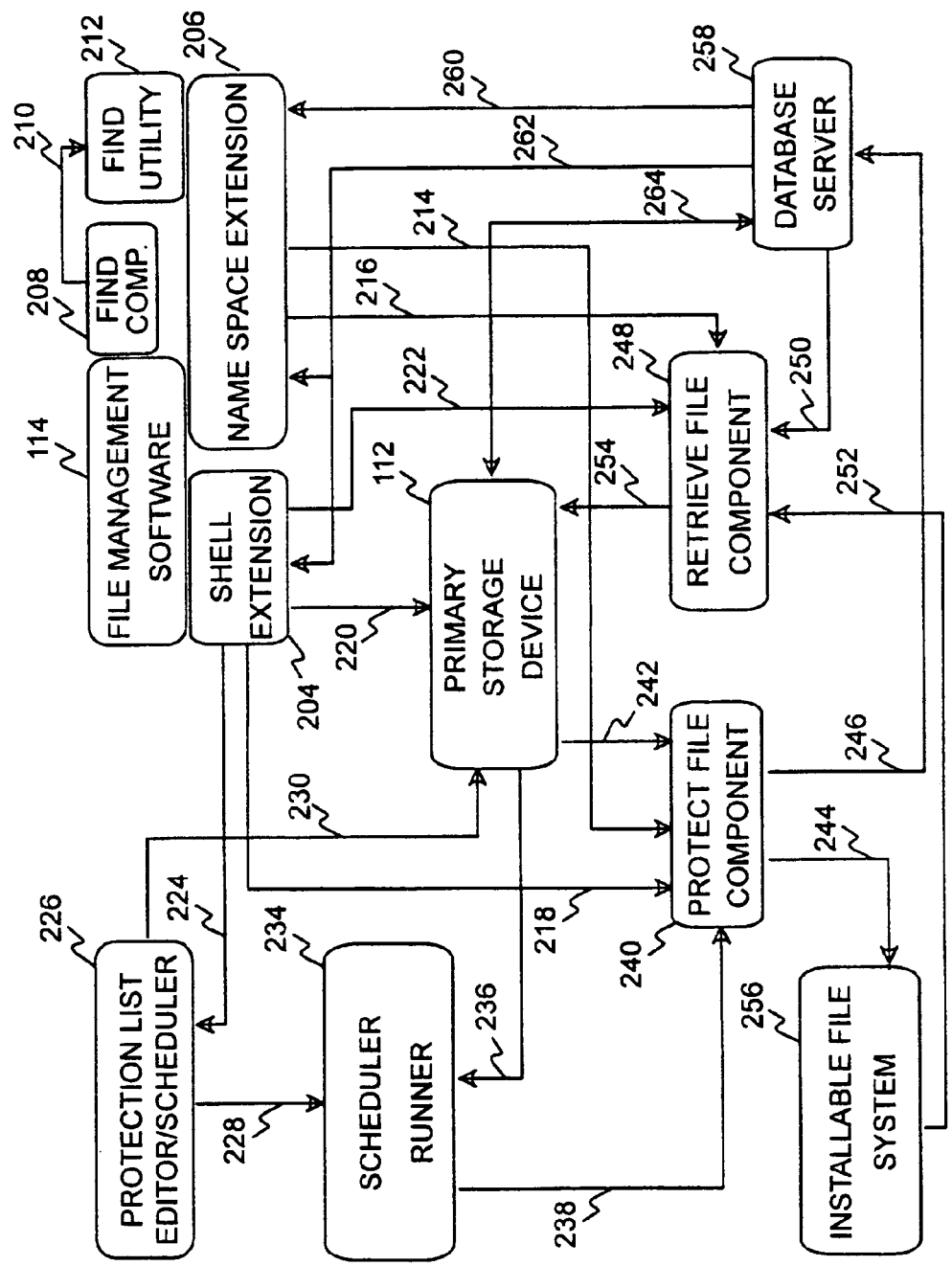
FIG. 2 shows a system view of the high level components of the data protection system of the present invention.

FIG. 2 shows a system view of the high level components of the data protection system of the present invention. Referring now to FIG. 2, Existing File Management Software 114 interacts with Shell Extension 204, Name Space Extension 206, and Find Component 208, which in the preferred embodiment of the invention are all Dynamic Link Library (DLL) files. Find Component 208 is loaded by Existing File Management Software 114 for the purpose of extending the 'Find' Frame Menu Option (and Operating System Start Button Find Menu) to include the ability to find files within the data protection system domain. Arrow 210 shows that if the user clicks on 'Find' in the Frame Menu Option or Operating System Start Button Find Menu, Find Component 208 invokes the Find Utility 212 component to carry out the operation. Find Component 208 inserts a string menu option into the list of Find Menu choices and if the user selects the Find DLL string, Find Component 208 is notified and invokes Find Utility 212.

The Name Space Extension 206 component provides an in-process Common Object Model (COM) object interface with which Existing File Management Software 114 may interact to extend the user's file system. This component has several responsibilities to provide integration into Existing File Management Software 114 for displaying the data protection system domain. First, if in 'Explore' mode (dual pane, tree/list view), Name Space Extension 206 provides a tree hierarchical representation of the file information saved in the database so that Existing File Management Software 114 may display this tree in its left pane. The tree represents the hierarchy of folders for the off line Removable Storage Media 124 that the product is tracking—the data protection system domain.

Name Space Extension 206 must also control the right pane of Existing File Management Software 114 (or the only pane if in 'Open'/single pane view mode), and display the contents of the currently open folder in the data protection system domain in similar manner as folders and files are displayed for the local on line drives. The frame menu must also be controlled when the context is within the data protection system domain (i.e., objects within the data protection system domain are highlighted/selected) and provide context menus for objects displayed in the data protection system domain with the 'Retrieve' and 'View Versions' Options. Name Space Extension 206 also alters Existing File Management Software 114 frame menus, tool bars, and status bar text as appropriate. Context menus are also supplied by Name Space Extension 206 for all objects exposed at and under the root folder of Name Space Extension 206. The context menu that appears depends on the object selected.

Additionally, Name Space Extension 206 must invoke a Data Protection System Version Display Dialog Box that displays information about all versions of the selected file when the user selects the 'View Versions' Option on the data protection system domain object's associated context menu (as mentioned above). Arrow 214 shows that Name Space Extension 206 also invokes the Protect File Component 240 when files are dropped (from a drag and drop maneuver with a mouse or a copy and paste menu action) onto the data protection system domain. And finally, Arrow 216 shows that Name Space Extension 206 invokes the Retrieve File Component 248 for the selected files when the user selects the 'Retrieve' Option on the data protection system domain object's associated context menu.

Shell Extension 204 is also loaded by Existing File Management Software 114 for the purpose of extending the context menu of Existing File Management Software 114 objects that are not within the data protection system domain. Shell Extension 204 extends the context menu of non data protection system domain Existing File Management Software 114 files, folders, and disk drives with the new options of 'Protect', 'Add to Protection List', and 'View Versions' (for files only). Each menu option has a handler function that is invoked when the user selects one such option. Arrow 218 shows that Shell Extension 204 also invokes the Protect File Component 240 when the user selects the 'Protect' Option on the associated context menu.

Arrow 220 shows that Shell Extension 204 also adds the file name and full path of each of the selected files to the Protection List Text File, discussed below regarding the Protection List Editor Scheduler 226 component, and stores it on Primary Storage Device 112 when the user selects the 'Add to Protection List' Option on the associated context menu. Shell Extension 204 also invokes a Data Protection System Version Display Dialog Box that displays information about all versions of the selected file that may be within the data protection system domain when the user selects the 'View Versions' Option on its associated context menu.

Arrow 222 shows that Shell Extension 204 invokes the Retrieve File Component 248 if the user selects the 'Retrieve' Option on a particular version of a file while in the Data Protection System Version Display Dialog Box mentioned above. Finally, Arrow 224 shows that Shell Extension 204 allows the user to view the current Protection List in order to make changes or verify which files are scheduled to be protected.

Find Utility 212 compliments an already existing find utility, which in the preferred embodiment of the invention is the Windows Explorer Find Utility, to allow users to find files that are being tracked in the data protection system domain. Again, this is integrated so that based on the context of invocation of the Windows Explorer Find Utility that the user is familiar with, the user will interact with either the standard Windows Explorer Find Utility or the Find Component 208 and Find Utility 212 components. When finding objects within the data protection system domain, the user may specify a single wildcard or name representing folders/files, and optionally either a date range for the modified date time stamp of the files within the data protection system domain and/or a date range for the time that the files were protected into the data protection system domain.

Find Utility 212 may be invoked either by Find Component 208, or by Name Space Extension 206 when the user selects the 'Find' Option from Name Space Extension 206 folder's context menu. Find Utility 212 also provides a context menu for files that appear in the result list of the find operation. This context menu is actually supplied via Name Space Extension 206. The same options provided by Name Space Extension 206 are automatically available to find results.

The Protection List Editor Scheduler 226 component is a standalone utility that allows the user to create and modify a profile of files on their system that they would like to have protected on a regular basis. Individual files, file types, whole folders and sub-folders, as well as wild carded entries may be added or removed from the Protection List from this component. The user may also choose to protect the files immediately and/or specify a schedule that is to be applied such that the files are automatically protected regularly per the schedule. Arrow 228 shows that if a schedule is specified, Protection List Editor Scheduler 226 invokes the Scheduler Runner 234 to watch the system clock and perform the protection operation specified in the schedule. Arrow 230 shows that changes made to the Protection List Text File are saved to Primary Storage Device 112, which is the user's local hard drive(s).

The Scheduler Runner 234 component watches the system clock to determine when to begin an operation to protect the files contained in the Protection List. Arrow 236 shows that Scheduler Runner 234 receives the Protection List Text File from Primary Storage Device 112 as input for the scheduled operation. Arrow 238 shows that when the scheduled time arrives, Scheduler Runner 234 passes the contents of the Protection List Text File to Protect File Component 240.

Protect File Component 240 is a COM object local out-of-process server that controls all aspects of copying files from Primary Storage Device 112 to the Installable File System 256. Protect File Component 240 accepts a list of IDataObjects, a Microsoft COM object, that describes a list of files that are to be protected within the data protection system domain. Arrow 242 shows that this process involves reading the specified files from Primary Storage Device 112 (or accessible network drives). Arrow 244 shows that these files are then copied to the Installable File System 256. In the preferred embodiment of the invention, Installable File System 256 consists of a writeable or re-writeable CD device with an installed IFS interface. Arrow 246 shows that Protect File Component 240 is also responsible for saving file information (names, attributes, sizes, date stamps, etc.), along with the source location as well as the target location, and removable storage medium 124 identification to the Database Server 258. Protect File Component 240 also checks the files protect status with the Database Server 258 and updates it if the file is reprotected. The Protect File Component 240 and the Retrieve File Component 248 are actually implemented within the same executable file.

Retrieve File Component 248 is a COM object local out-of-process server that controls all the aspects of copying files from Installable File System 256 back to Primary Storage Device 112. Retrieve File Component 248 accepts a list of unique database IDs for files that are to be restored from the data protection system domain back onto Primary Storage Device 112 (or accessible network drives). Arrow 250 shows that this component retrieves information about the files/folders to be restored from the Database Server 258. Arrow 252 shows that Retrieve File Component 248 reads the specified files from the appropriate Removable Storage Medium 124 (prompting for its insertion if necessary), and Arrow 254 shows that this component then copies the specified files onto Primary Storage Device 112 (or accessible network drives). This component also allows the user to specify an alternate target location other than the default location (which is the original source location as saved in Database Server 258).

The Database Server 258 is a COM object local out-of-process server that, in the preferred embodiment of the invention, provides a C++ object interface to an underlying Microsoft Data Access Object (DAO) relational database. Its purpose, as Arrow 264 shows, is to read/update the database file on Primary Storage Device 112 and to save file related information such as names, attributes, sizes, date stamps, etc., along with a source location on Primary Storage Device 112 (or network drives) as well as a target location on a Removable Storage Medium 124. In addition, Database Server 258 is responsible for relating all copies of files that have the same source location as multiple versions of a single logical file. Removable Storage Medium 124 identification is saved as well, along with information that groups multiple files that were copied/protected in the same operation. This saved information is available for displaying, traversing, and searching via the object interface provided. Arrow 260 shows that Database Server 258 provides information to Name Space Extension 206 about the Removable Storage Medium 124 and/or files/folders contained in a selected entry. Arrow 262 shows that this component also supplies information to Name Space Extension 206 and to Shell Extension 204 regarding version information on a selected file.

Figure 3:
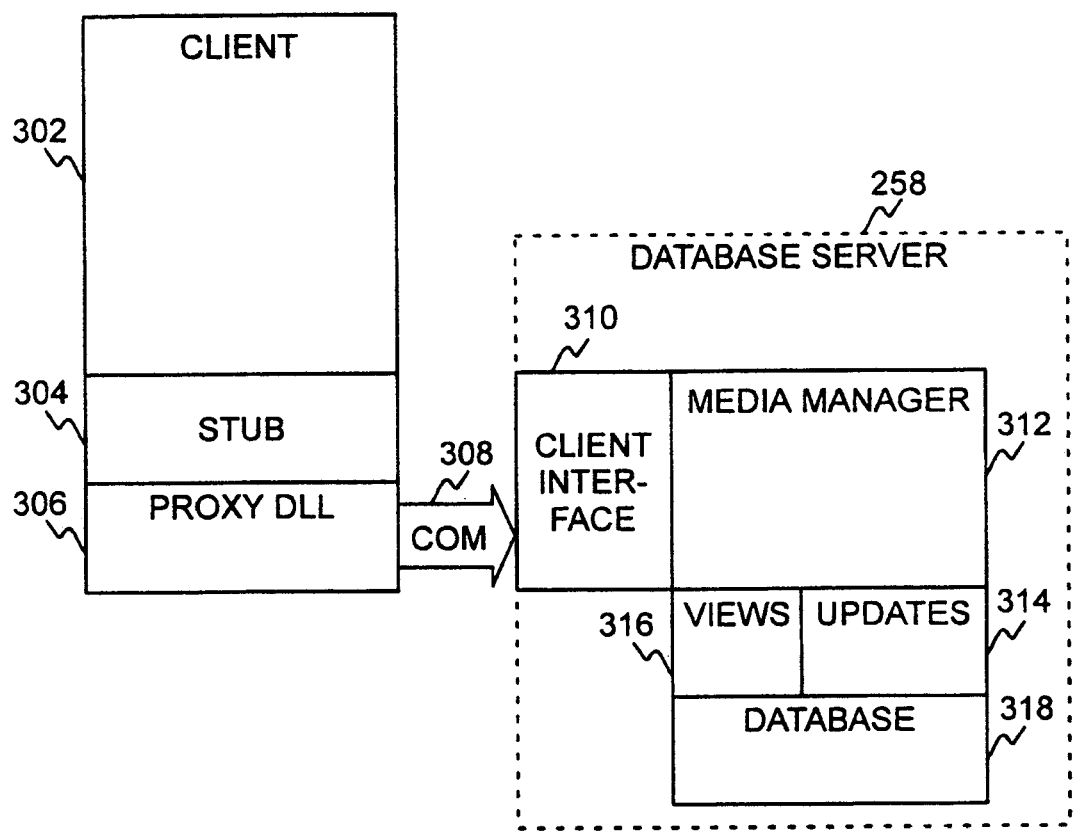
FIG. 3 shows an architectural view of the database server of the present invention.

FIG. 3 shows an architectural view of the database server of the present invention. Referring now to FIG. 3, Client 302 links with Stub 304, which is a stub version of Media Manager 312 on the client side that encapsulates all of the COM 308 interaction to the Client Interface 310 of Database Server 258.

Media Manager 312 is designed to save a running history of the user's file system. It tracks Removable Storage Media 124, temporal collections of files, called document sets, and files and folders. It also tracks the original location of files that are copied to new locations. Media Manager 312 relates not only copies of the same file, but also files that have been changed. All such files will have a common source location. Version information, such as create/modify/access dates, file sizes, attributes, new file name if different from original, etc., are all saved so that specific instances of files may be located based on this information.

Media Manager 312 can show a familiar hierarchy of files and folders that have been saved in Database 318 as one large tree structure, or the files and folders can be separated by the Removable Storage Media 124 that they actually reside on. They may be further separated by the document set collection that they belong to. In addition, the above three viewing options can show the files and folders with respect to where they originated, called the source view, or by their actual physical locations on Removable Storage Media 124. Any given file has a related list of versions each of which may have one or more actual physical locations.

Database Server 258 has its own user interface which may be used to interrogate the current contents of Database 318. It also allows for automatic population, deletion, and manipulation of its contents. The user interface for Database Server 258 is directly connected to Media Manager 312 as a static library. When accessed by Client 302, however, the user interface for Database Server 258 is invisible.

There are two basic types of objects in the user interface to Media Manager 312, MMLists and MMItems. From MMItems are derived all the other main file system objects: MMMedia which are sources of Removable Storage Media 124, MMDocumentSet which are groups of files belonging to the same copy operation, and MMEntry which are file system entries, further distinguished as either folders or documents (files).

Client Interface 310 is also directly connected to Media Manager 312. This layer serves as the translation layer between COM 308 function calls that Client 302 triggers, and the actual objects that live in the server process space of Media Manager 312. This is because COM 308 does not marshal structured data, i.e., C++ objects, in a standard way. Client Interface 310 is required because the interface for Media Manager 312 cannot be directly exposed via COM 308.

Media Manager 312 rests on Updates 314 and Views 316, another object interface layer, which provides query classes and basic add and delete functionality. Each class basically resolves to a customized database query with access functions to obtain the field values from the resulting set of records. Views 316 is used to show the hierarchy relationship of the files stored on Removable Storage Media 124. Updates 314 is used to alter the database. At the lowest level is Database 318 which directly manipulates the database.

Client 302 may add new objects, delete, or modify existing objects in Database 318. Client 302 instantiates objects in its own process space via Stub 304, and a corresponding real object is created in Media Manager 312. Stub 304 and Client Interface 310 work together to reflect the actual data from Media Manager 312 into the Client 302 process space. In this way, Client 302 remains ignorant that it is even using COM 308. Proxy DLL 306 is transparently and automatically loaded by Client 302 to handle marshaling of the data for the custom Client Interface 310.

Figure 4A:
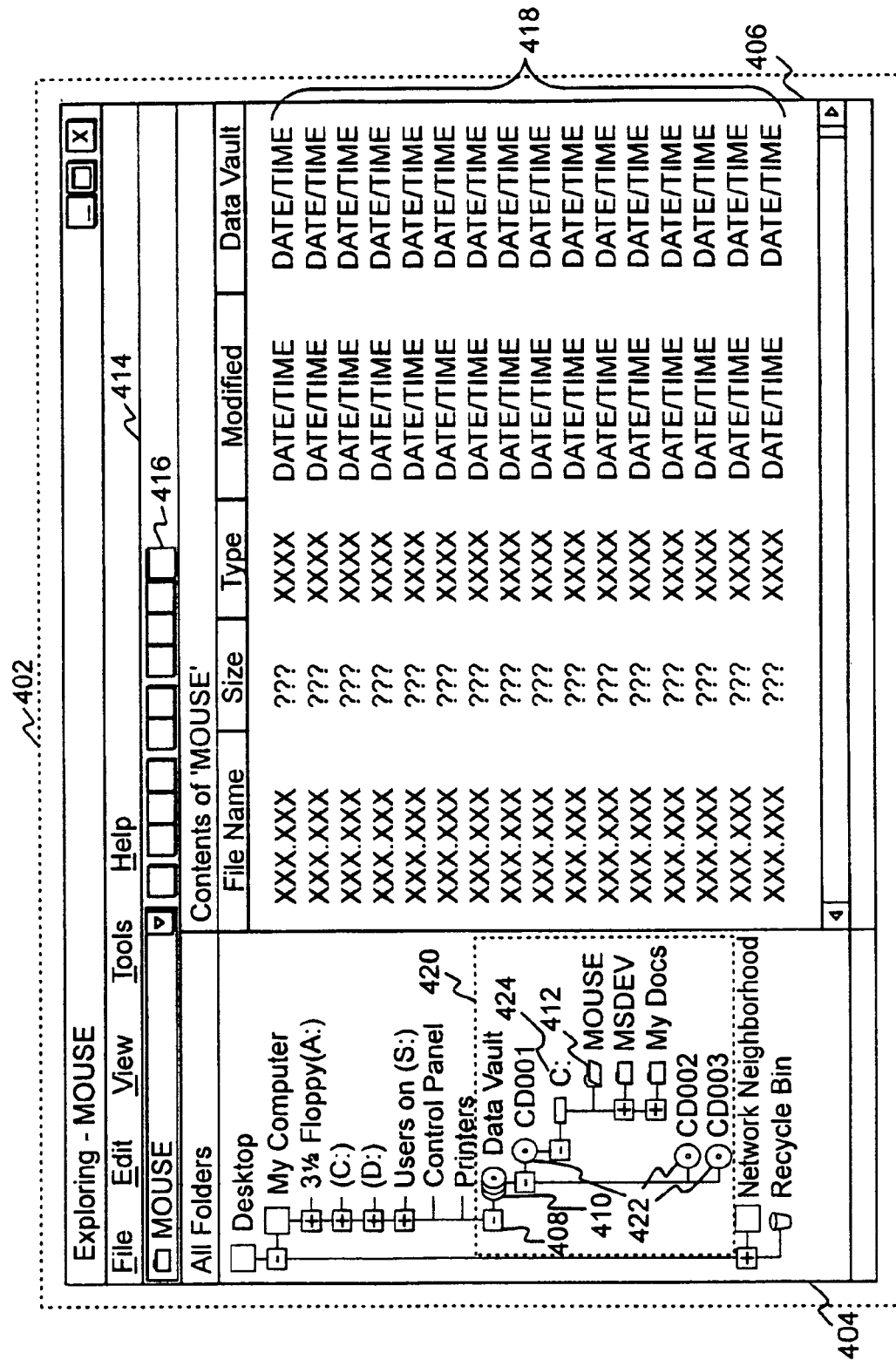
FIG. 4A shows a file management software example screen display output from the data protection system of the present invention.

FIG. 4A shows a file management software example screen display output from the data protection system of the present invention. Referring now to FIG. 4, a Screen Display 402 from Existing File Management Software 114 (FIG. 1) is shown having a Left Pane 404 and a Right Pane 406. Double clicking on the Data Vault Folder Item 410 in Left Pane 404 of Existing File Management Software 114 opens up Data Vault Folder Item 410 and causes Left Pane 404 and Right Pane 406 to populate with the top level content of Database 318 (FIG. 3). Double clicking on any now displayed folder item will cause the next level of content to be populated and displayed, which may contain files and more folders. Thus, for a file to appear in Right Pane 406, all of its parent folders in the tree format up to the root Data Vault Folder Item 410 must be opened. The version history of a file can be accessed by right clicking on the file in Right Pane 406 and selecting the appropriate option from the context menu that appears.

In Left Pane 404, Plus Box 408 indicates by the minus sign that Data Vault Folder Item 410 has been expanded, revealing Data Protection System Domain 420, the graphical representation of the off line Removable Storage Media 124 and files being tracked by the data protection system of the present invention.

The Data Vault Folder Item 410 serves as a drop target for files to be protected as well as a drag source for file restoration. Context menu entries are also created as part of the Data Vault Folder Item 410 functionality, allowing the user to find files and look at their version history. Rather than using a separate application to view the contents of Database 318, the design of Data Protection Software 120 (FIG. 1) is modeled to match Existing File Management Software 114 in terms of look and feel. The user is able to utilize the conventions he is already familiar with, such as browse, explore, right click, left click, double click, drag and drop, and copy and paste. Mimicking the Existing File Management Software 114 user interface provides integration and ease-of-use that users logically expect. This also enables users to utilize Data Protection Software 120 much faster than if they had to learn the methods and procedures for a separate application user interface.

Under Data Vault Folder Item 410 are media source folder items 422, indicating the different removable storage Removable Storage Medium 124 (FIG. 1) that have been used in protecting files. In this example, three such Removable Storage Medium 124 have been used, labeled CD 001, CD 002, and CD 003. When a Media Source Folder Item 422 is opened up by clicking on its associated plus box, the directory structures for all the files protected on the associated Removable Storage Medium 124 are displayed. For example, Source Drive Item 424 indicates that files from the C Drive have been protected on CD 001. Listed beneath Source Drive Item 424 are all the Folder Items 412 and sub folders (not shown in FIG. 4) in the directory path for the files that have been protected on CD 001.

Folder Item 412 labeled 'Mouse' has been opened by clicking on it, and Right Pane 406 is populated with the Contents 418 of Folder Item 412. Contents 418 consist of a list of files that have been protected from the user's system on the C drive from Folder Item 412. Contents 418 indicates for each file the file name, size, type, date/time modified, and date/time last stored in the data protection system domain. Existing File Management Software 114 access means, such as right click, drag and drop, and copy and paste, work the same in the data protection system as they do for other disks and files displayed in Existing File Management Software 114. Secondary (duplicate) access points are provided on the Existing File Management Software 114 menus and tool bars.

For example, standard items not applicable to the data protection system domain are not removed from the File Management Software Tool Bar 414, but instead are grayed out as appropriate, as represented by Standard Item 416. When the Data Vault Folder Item 410 is highlighted in Existing File Management Software 114, items not applicable in the Existing File Management Software 114 menu system are grayed out as appropriate. Items are added to the Existing File Management Software 114 menu system as appropriate to provide duplicate access points for right click and/or drag and drop functionality. These items are added by creating a data protection system entry as necessary in applicable pull down menus, and creating a submenu of data protection choices in each case.

In addition to Data Vault Folder Item 410, there is a desktop icon link to the Existing File Management Software 114 entry, and an entry in the CD drive program group which links to the Existing File Management Software 114 item. Starting the data protection system from either the desktop or the CD drive program group will pop open Existing File Management Software 114 providing access to the data protection system.

Figure 4B:
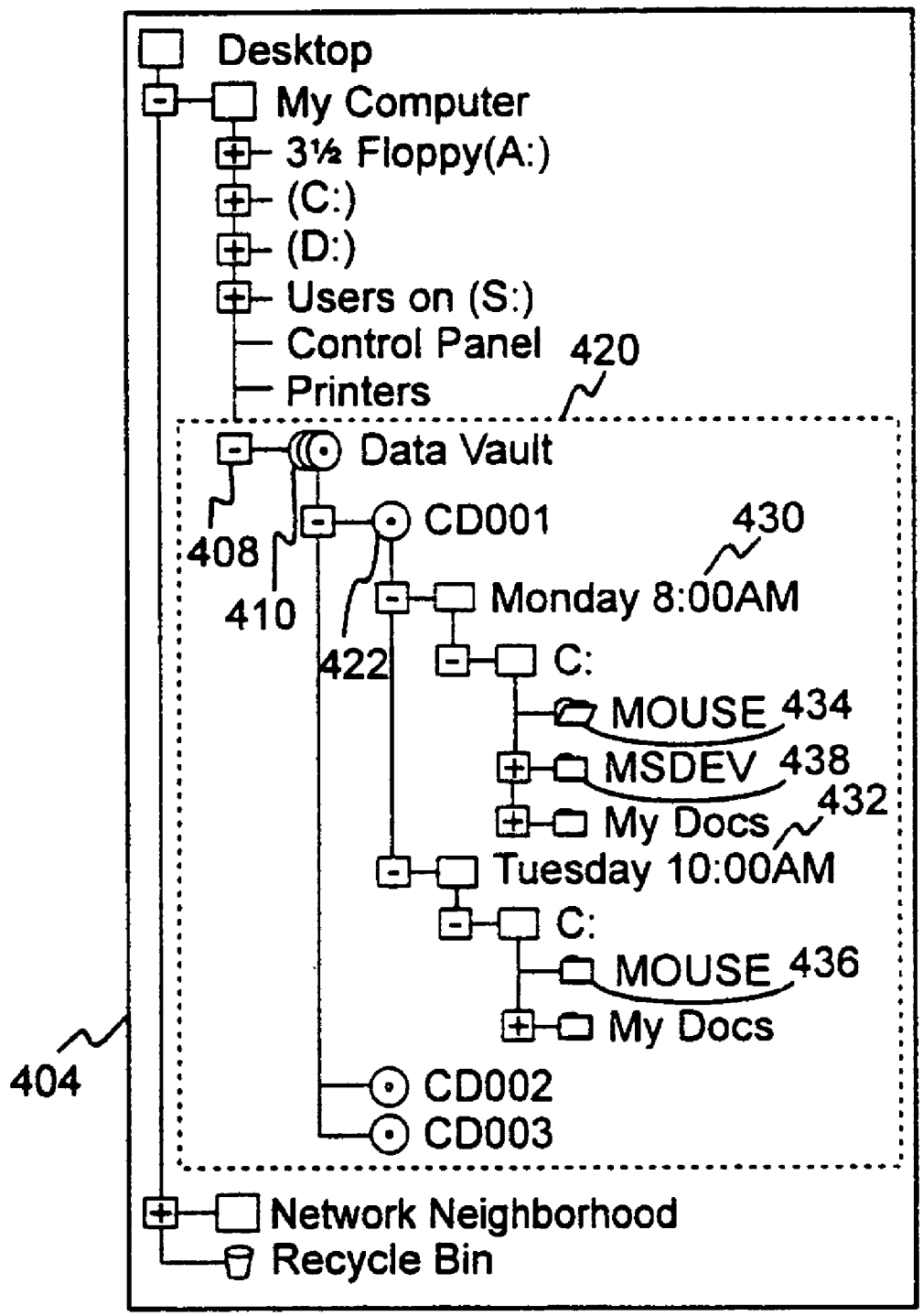
FIG. 4B shows an alternative embodiment of the left pane of FIG. 4A.

FIG. 4B shows an alternative view of the left pane 404 of FIG. 4A. Referring to FIG. 4B, Data Vault Folder Item 410 still serves as a drop target for files to be protected as well as a drag source for file restoration, as in FIG. 4A. In the embodiment of FIG. 4B, CD001 422 has been expanded in an alternative way to show two different version histories of files in the Data Vault. In this example, CD001 422 contains versions for Monday 8:00 AM 430 and Tuesday 10:00 AM 432. The Monday 8:00 AM 430 version contains a copy of the 'Mouse' file 434 from the 'C:' drive and the Tuesday 10:00 AM 432 also contains a copy of the 'Mouse' file 436 from the 'C:' drive thus easily indicating which version history files are available to the user. This view also clearly indicates when a version is not available, for example 'MS DEV' 438 is available in the Monday 8:00 AM 430 version, but not in the Tuesday 10:00 AM 432 version.

Figure 4C:
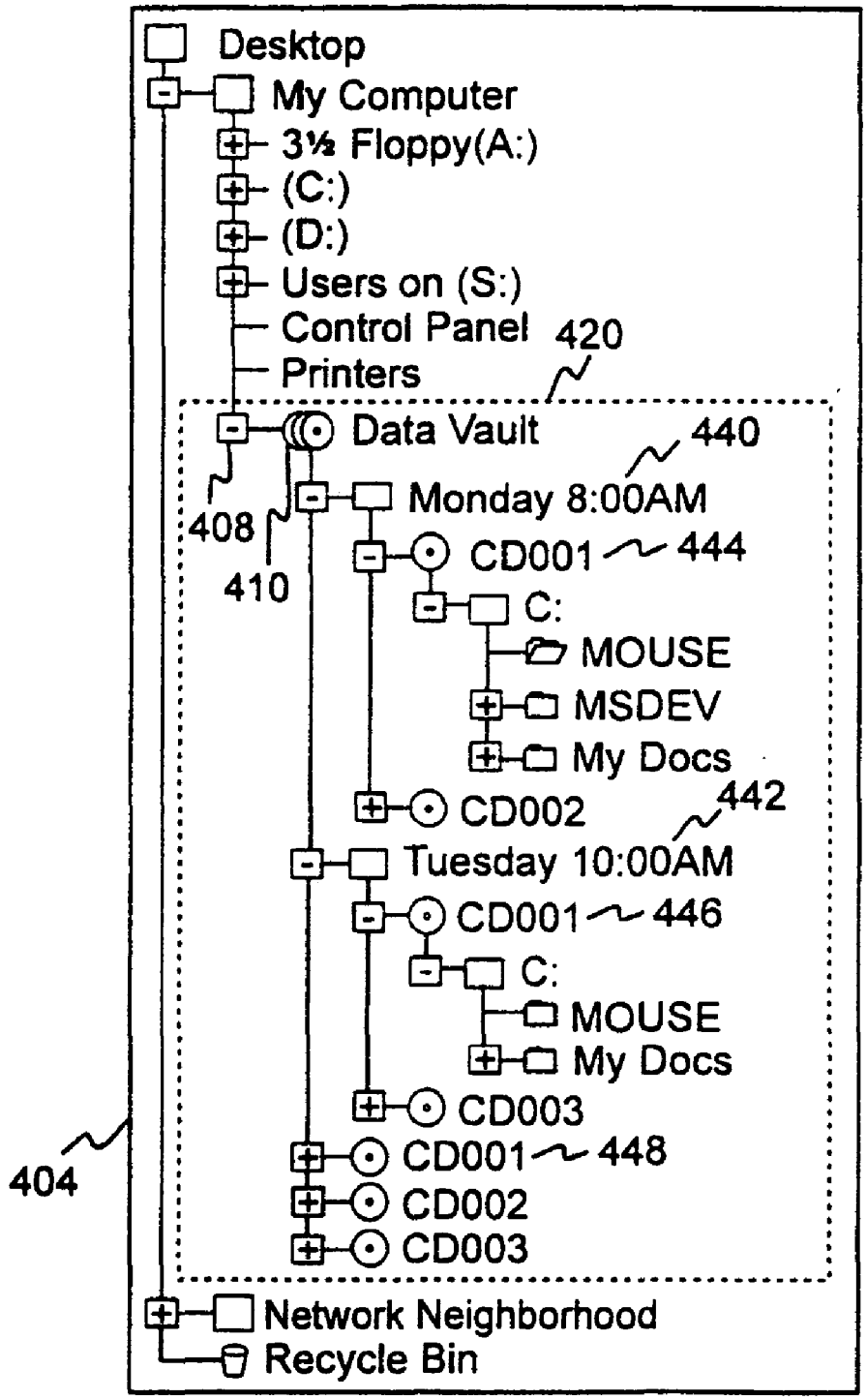
FIG. 4C shows a second alternative embodiment of the left pane of FIG. 4A.

FIG. 4C shows a second alternative view of the left pane 404 of FIG. 4A. Referring to FIG. 4C, this view shows a combination of the views of the left pane 404 in FIG. 4A and FIG. 4B. In this view the contents of CD001 are presented in multiple ways. The version of Monday 8:00 AM 440 is shown containing CD001 444, and the version of Tuesday 10:00 AM 442 is also shown containing CD001 446, allowing the user to display the files in a manner similar to FIG. 4B. In addition, CD001 448 is shown independently of the two versions, allowing the user to display the files in the same manner as FIG. 4A.

Figure 5:
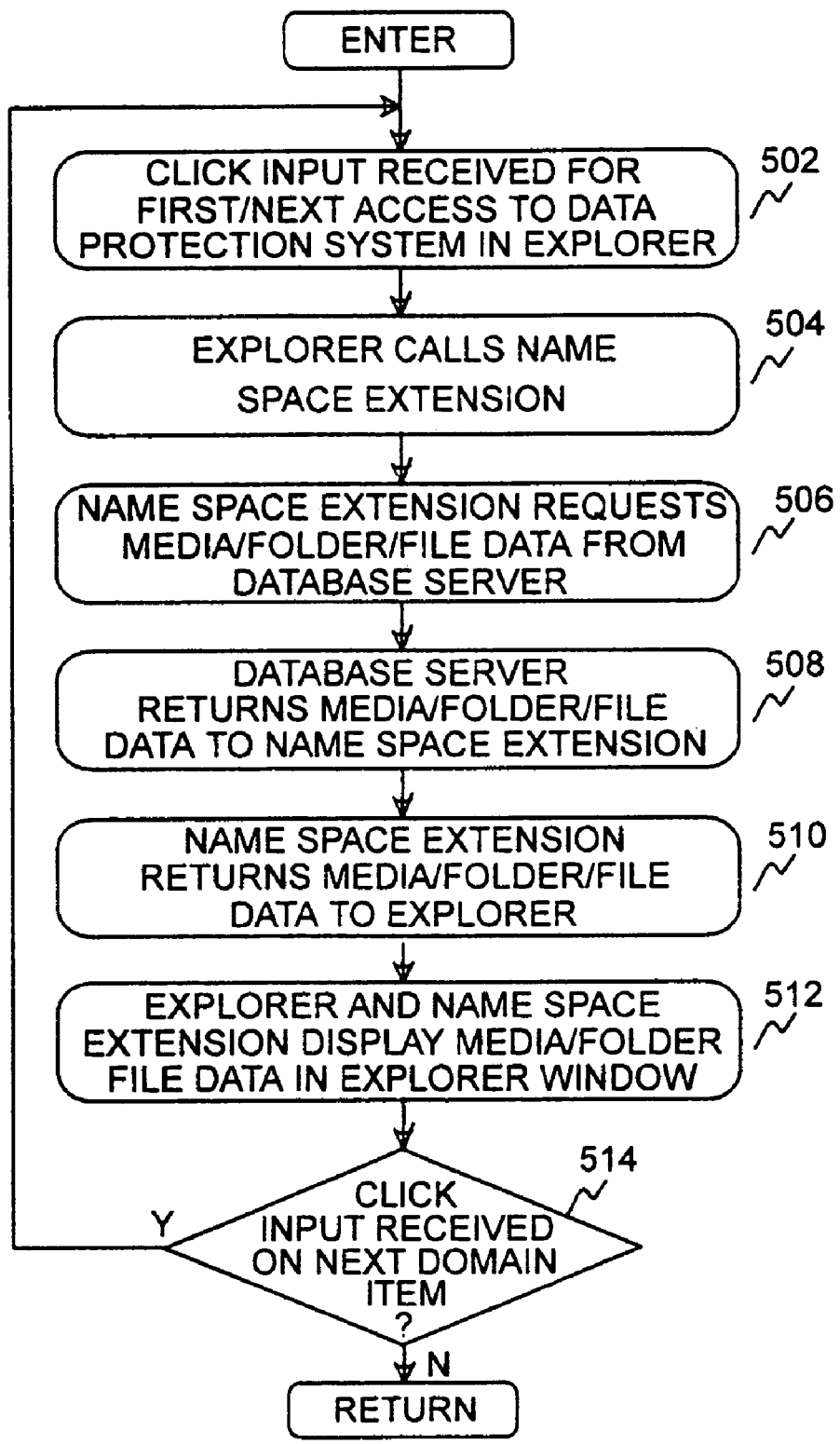
FIG. 5 shows a block diagram for populating the file management software hierarchical tree in the data protection system of the present invention.

FIG. 5 shows a block diagram for populating the Existing File Management Software 114 tree in the data protection system of the present invention. When Existing File Management Software 114 is opened up by the user, Data Vault Folder Item 410 is visible under My Computer in Left Pane 404 (FIG. 4) because Data Protection Software 120 (FIG. 1) has been registered in the registry during installation, but it is not running. When click input is received from Graphical Input Device 108 (FIG. 1) on Data Vault Folder Item 410 in Left Pane 404, Data Protection Software 120 begins to run. Alternatively, the data protection system may be accessed by receiving double click input on the data protection system desktop icon, which will pop open Existing File Management Software 114 providing access to Data Vault Folder Item 410.

In the preferred embodiment of the invention, Data Protection Software 120 is written in C++ using the standard Win32 Software Development Kit (SDK) Application Programming Interface (API) calls, and some Microsoft Foundation Classes (MFC). During the install process, several COM interfaces used for different components of Data Protection Software 120, and their class IDs and interface IDs are entered into the Windows registry. After installation, a data protection system icon appears on the desktop that is linked to Data Vault Folder Item 410 within Existing File Management Software 114.

Some of the interfaces are standard interfaces defined by the Existing Operating System 118. These are necessarily implemented by the Name Space Extension 206, Shell Extension 204, and Find Component 208 (FIG. 2) in order to "plug" into the Existing File Management Software 114 shell. That is, Existing File Management Software 114 expects these interfaces to be present, although not all of the methods need to be implemented in the server component.

Other interfaces are custom COM interfaces for the purposes of inter-component interaction. The custom COM interfaces register marshaling proxy DLLs under their component's interface ID so that client processes may load these DLL's to handle packaging up input/output parameters to the interface methods, since these methods are not standard COM interfaces. The custom interfaces include a Protect EXE COM Interface, a Retrieve EXE COM Interface, and a Database Server EXE COM Interface.

Referring now to FIG. 5, in step 502 the data protection system is first accessed by the user browsing in Existing-File Management Software 114. When click input is received on Data Vault Folder Item 410, the data returned by Database Server 258 (FIG. 2) to expand the Existing File Management Software 114 tree is the highest level of data, which is data regarding the individual off-line Removable Storage Medium 124 containing files that have been protected with the data protection system.

In step 504, due to the click input received in step 502, Existing File Management Software 114 calls Name Space Extension 206 (FIG. 2). In step 506 Name Space Extension 206 requests data from Database Server 258 (FIG. 2).

In step 508, Database Server 258 gathers the data requested from Views 316 and Database 318 (FIG. 3) and returns the data to Name Space Extension 206. In step 510, Name Space Extension 206 returns the data to Existing File Management Software 114. In step 512, Existing File Management Software 114 uses the data returned to populate and display the off-line Removable Storage Media 124 data in the Existing File Management Software 114 hierarchical tree in Left Pane 404 as media icons and media names, such as media source folder items 422 named CD 001, CD 002, and CD 003 as shown in FIG. 4. Name Space Extension 206, which controls Right Pane 406 (FIG. 4), displays in Right Pane 406 data about the files protected on off-line Removable Storage Media 124 shown in Left Pane 404, such as media name, type, date, and time.

Step 514 determines if click input is received on a next media icon or name displayed in Left Pane 404, or displayed in Right Pane 406, within the data protection system domain. If no click input is received on any of the media icons or names within the data protection system domain in step 514, control returns to Existing Operating System 118 (FIG. 1) to await user input within Existing File Management Software 114 or some other application. If, however, click input is received on a next media icon or name within the data protection system domain in step 514, control returns to step 502, where the new click input is processed. For example, in Left Pane 404, the hierarchical structure of the media icon or name that click input was received on is displayed under the media icon and name, showing drive, folder icon, and folder name information. In Right Pane 406, the folder name and type is displayed. If subsequent click input is received on a folder icon or name in either Left Pane 404 or Right Pane 406, the folder icon is shown open in Left Pane 404, and all the files in the folder are enumerated in Right Pane 406, displaying Contents 418 (FIG. 4), such as file name, type, size, date last modified, and date last protected in the data protection system. One skilled in the art will recognize that click input may be received on higher or lower level icons or names within the data protection system domain in any order, causing the data displayed in Screen Display 402 to change accordingly.

Figure 6A:
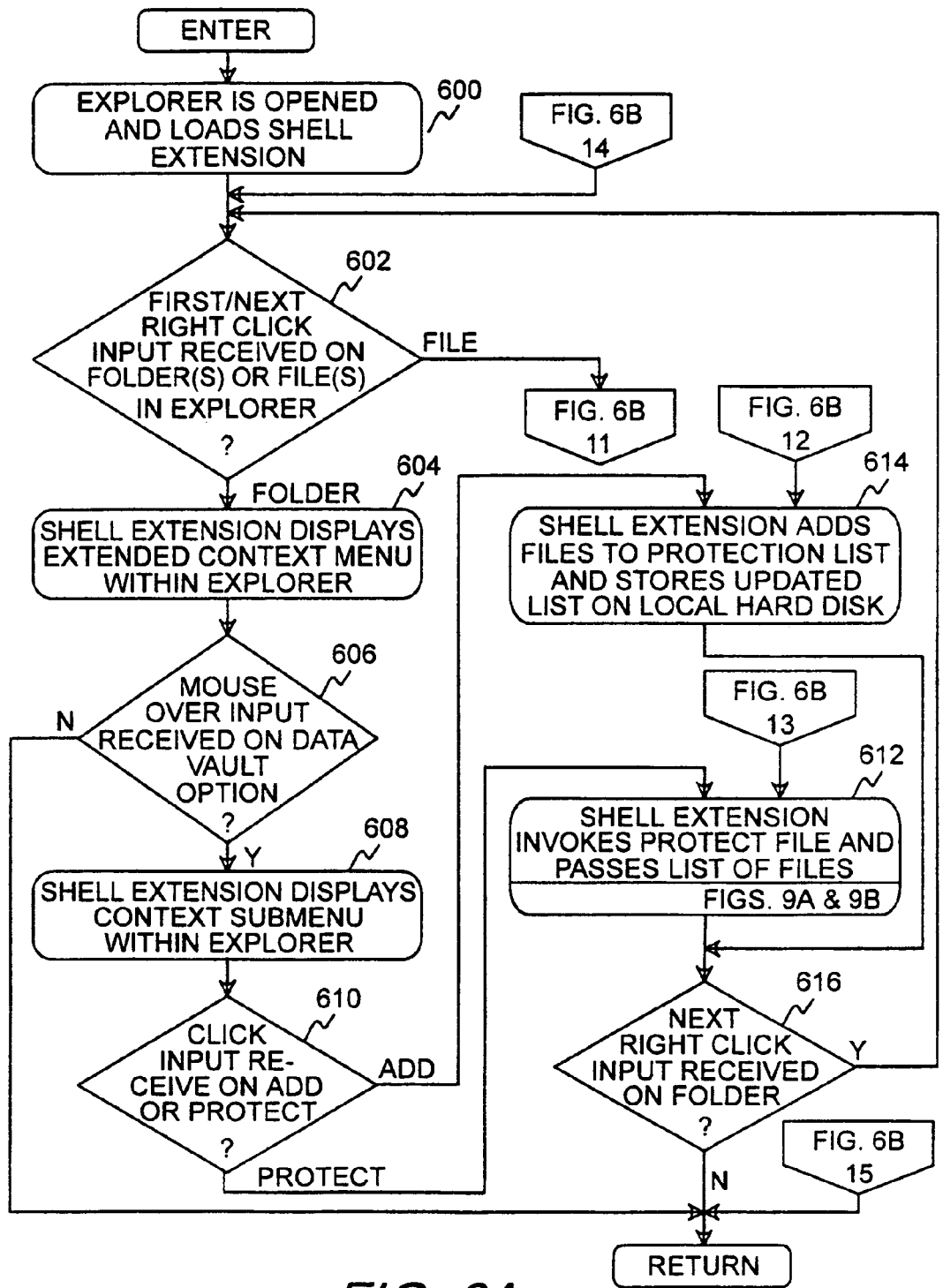
FIGS. 6A and 6B show a block diagram of protecting files using context menus in the data protection system of the present invention.
Figure 6B:
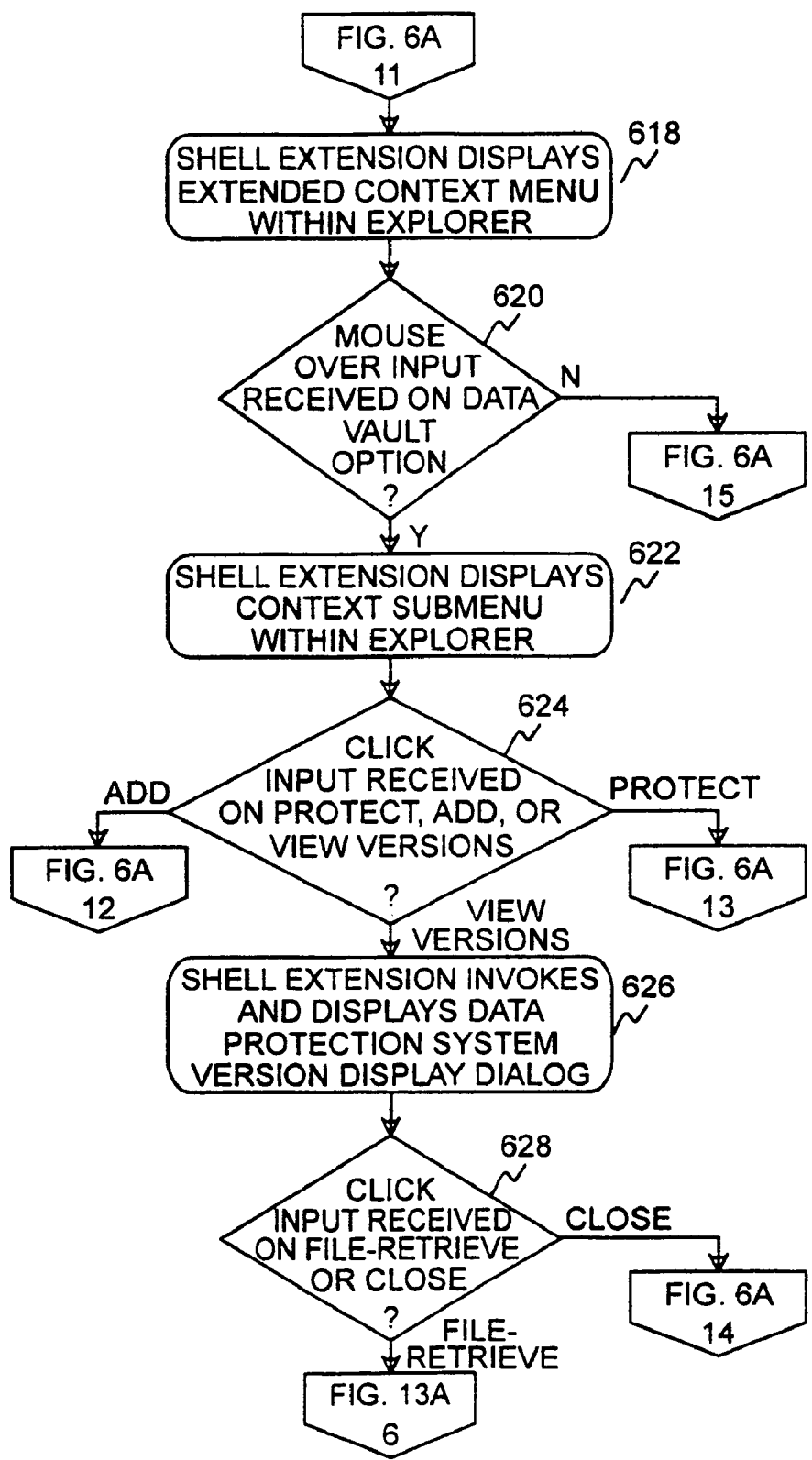

FIGS. 6A and 6B show a block diagram of protecting files using context menus in the data protection system of the present invention. Referring now to FIG. 6, in step 600 when Existing File Management Software 114 is opened, Existing File Management Software 114 loads, among other items, Shell Extension 204 (FIG. 2). Step 602 determines if a right click input from Graphical Input Device 108 (FIG. 1) is received on a folder or a file, or on a selected group of folders or a selected group of files, that are not within the data protection system domain. If right click input is received on a file or group of files, control passes to FIG. 6B, step 618. If right click input is received on a folder or group of folders, then in step 604 Shell Extension 204 displays a context menu in Screen Display 402 (FIG. 4) that has been extended to include a Data Vault Option among the normally appearing context menu options.

Step 606 determines if mouse over input is received on the Data Vault Option. If mouse over input is received on the Data Vault Option, then in step 608 Shell Extension 204 displays a context submenu in Screen Display 402. The context submenu contains 'Protect' and Add to Protection List' Options. If mouse over input is not received on the Data Vault Option in step 606, then control returns to Existing File Management Software 114.

Step 610 determines if click input is received on the 'Protect' or 'Add to Protection List' option. If click input is received on the 'Protect' Option in step 610, then in step 612 Shell Extension 204 invokes Protect File Component 240 (FIG. 2) and calls FIGS. 9A and 9B. After returning from FIGS. 9A and 9B, control passes to step 616.

If click input is received on the 'Add to Protection List' Option in step 610, then in step 614 Shell Extension 204 adds the file name and full path of each of the selected files to the Protection List Text File and stores the updated Protection List Text File on Primary Storage Device 112 (FIG. 1). Then step 616 determines if a next right click input is received on a folder, or on a selected group of folders, that are not within the data protection system domain. If the answer is yes, then control passes to step 602. If no further right click input on non Data Protection System Domain 420 items is received, then control returns to Existing File Management Software 114.

If right click input was received on a file or group of files in step 602, then in step 618 Shell Extension 204 displays a context menu in Screen Display 402 (FIG. 4) that has been extended to include a Data Vault Option among the normally appearing context menu options.

Step 620 determines if mouse over input is received on the Data Vault Option. If mouse over input is received on the Data Vault Option, then in step 622 Shell Extension 204 displays a context submenu in Screen Display 402. The context submenu contains 'Protect', 'Add to Protection List', and 'View Versions' Options. If mouse over input is not received on the Data Vault Option in step 606, then control returns to Existing File Management Software 114.

Step 624 determines if click input is received on the 'Protect', 'Add to Protection List', or 'View Versions' option. If click input is received on the 'Protect' Option in step 624, then control returns to step 612 where Shell Extension 204 invokes Protect File Component 240 (FIG. 2) and calls FIGS. 9A and 9B. After returning from FIGS. 9A and 9B, control passes to step 616.

If click input is received on the 'Add to Protection List' Option in step 624, then control returns to step where 614 Shell Extension 204 adds the file name and full path of each of the selected files to the Protection List Text File and stores the updated Protection List Text File on Primary Storage Device 112 (FIG. 1).

If click input is received on the 'View Versions' Option in step 624, then in step 626 Shell Extension 204 invokes and displays the Data Protection System Version Display Dialog Box in Screen Display 402. Then step 628 determines if click input is received on a file and then on a Retrieve Button, or on the Close Button. If click input is received on a file and then on the Retrieve Button, control transfers to FIG. 13A, step 1302. If the click input in step 628 is on the Close Button, then control returns to step 602.

Figure 7:
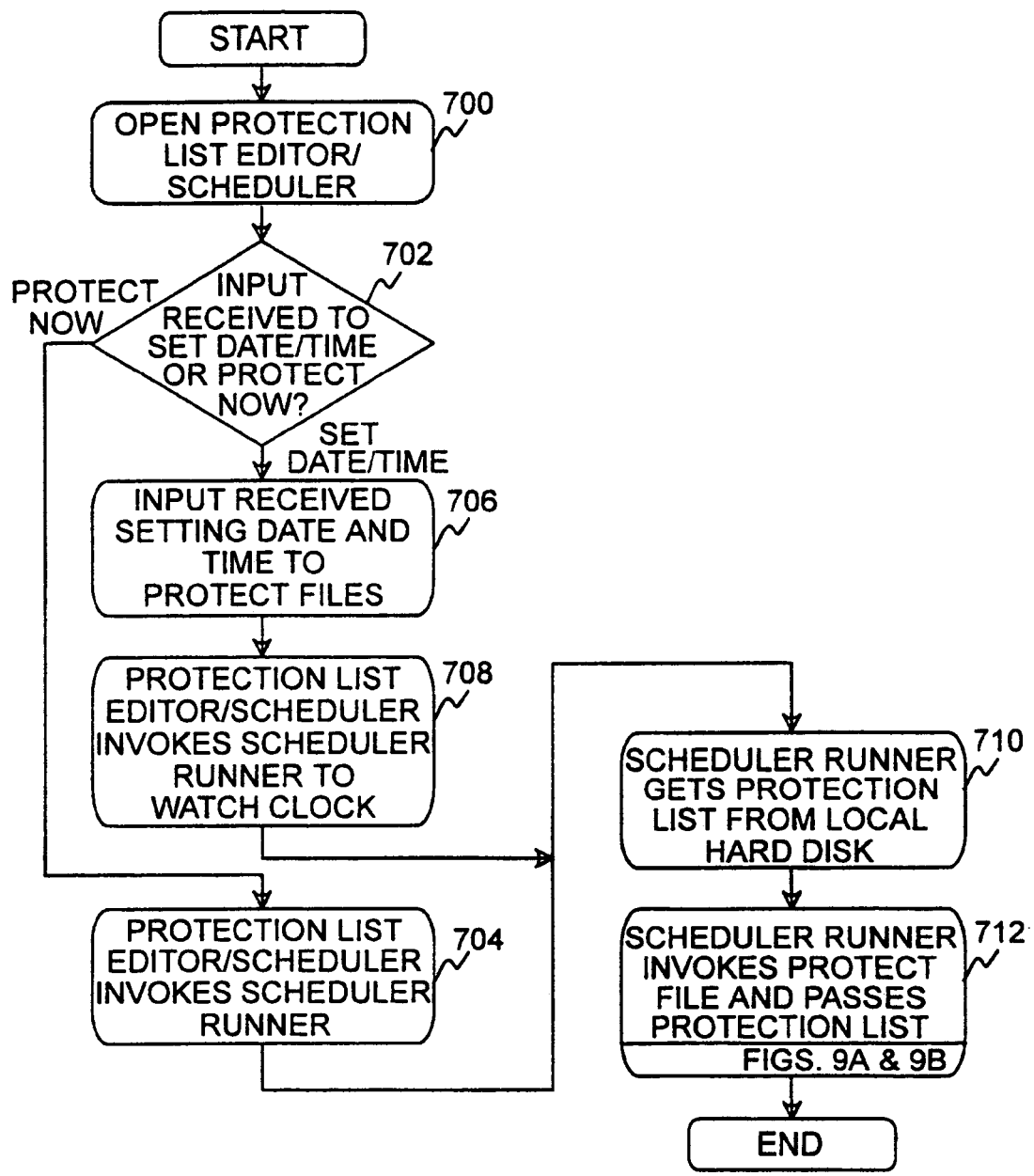
FIG. 7 shows a block diagram of protecting files using the stand alone utility in the data protection system of the present invention.

FIG. 7 shows a block diagram of protecting files using the stand alone utility in the data protection system of the present invention. Referring now to FIG. 7, in step 700 the Protection List Editor Scheduler 226 (FIG. 2) is opened displaying a Control Panel Dialog Box in graphics display device 110 (FIG. 1). Step 702 determines if input is received within the Control Panel Dialog Box to set a scheduled time for automatic protection of files, or if input is received to protect files now. If input is received to protect files now, then in step 704 Protection List Editor Scheduler 226 invokes Scheduler Runner 234 (FIG. 2) and control passes to step 710. If input is received in step 702 to set a scheduled time for automatic protection of files, then in step 706 input for a day or multiple days of the week and a time of day for the day or multiple days of the week is received, along with a preference to either protect all files in the Protection List Text File, or only those files in the Protection List Text File that have changed since the last protection session. Then in step 708, Protection List Editor Scheduler 226 invokes Scheduler Runner 234 to watch the system clock to determine when to begin an operation to protect the files in the Protection List Text File. When the scheduled time and the system clock match, then the protection operation begins in step 710.

In step 710 Scheduler Runner 234 retrieves the Protection List Text File from. Primary Storage Device 112 (FIG. 1). Then in step 712 Scheduler Runner 234 invokes Protect File Component 240 (FIG. 2), passing it the Protection List Text File, and calls FIGS. 9A and 9B. Upon returning from FIGS. 9A and 9B, Protection List Editor Scheduler 226 ends.

Figure 8:
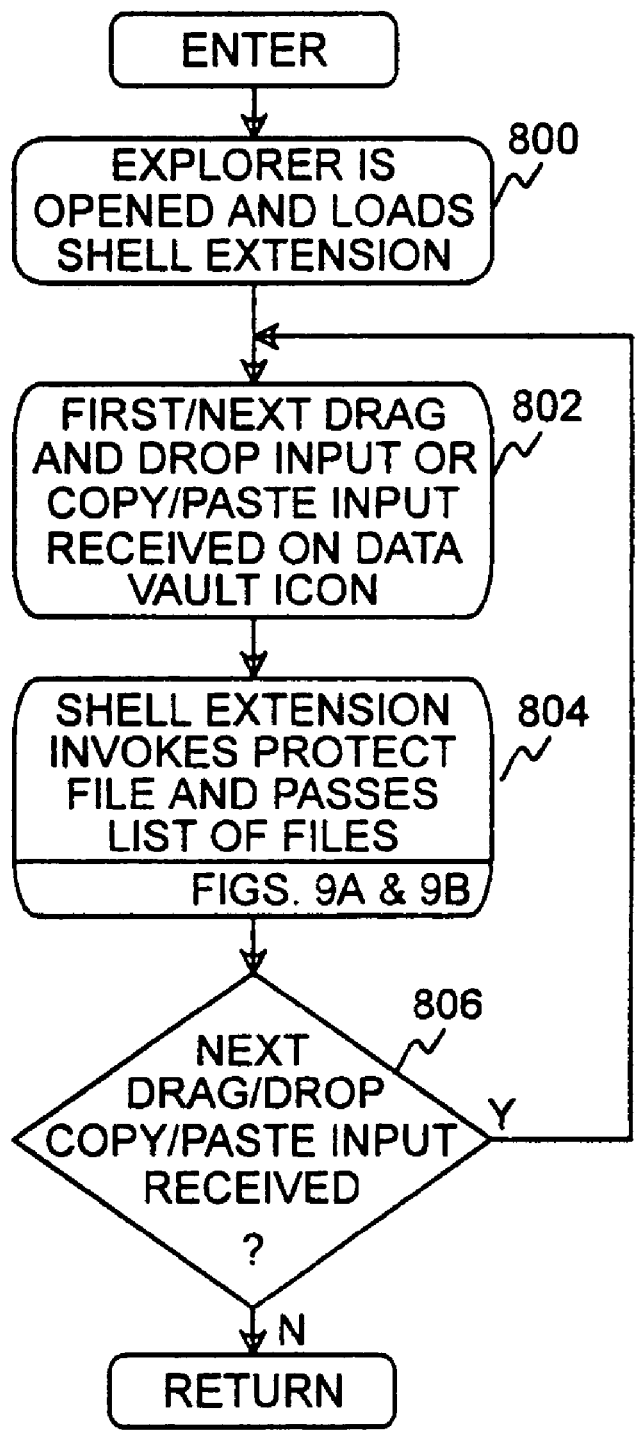
FIG. 8 shows a block diagram of protecting files using drag and drop or copy and paste in the data protection system of the present invention.

FIG. 8 shows a block diagram of protecting files using drag and drop or copy and paste in the data protection system of the present invention. Referring now to FIG. 8, in step 800 when Existing File Management Software 114 is opened, Existing File Management Software 114 loads, among other items, Shell Extension 204 (FIG. 2). Step 802 determines if drop input from a drag and drop maneuver, or paste input from a copy and paste maneuver, is received on Data Vault Folder Item 410 (FIG. 4). The drag input of the drag and drop maneuver, or copy input of the copy and paste maneuver, may be on a single file, a group of files, a folder, or a group of folders that are not within the data protection system domain.

Figure 9A:
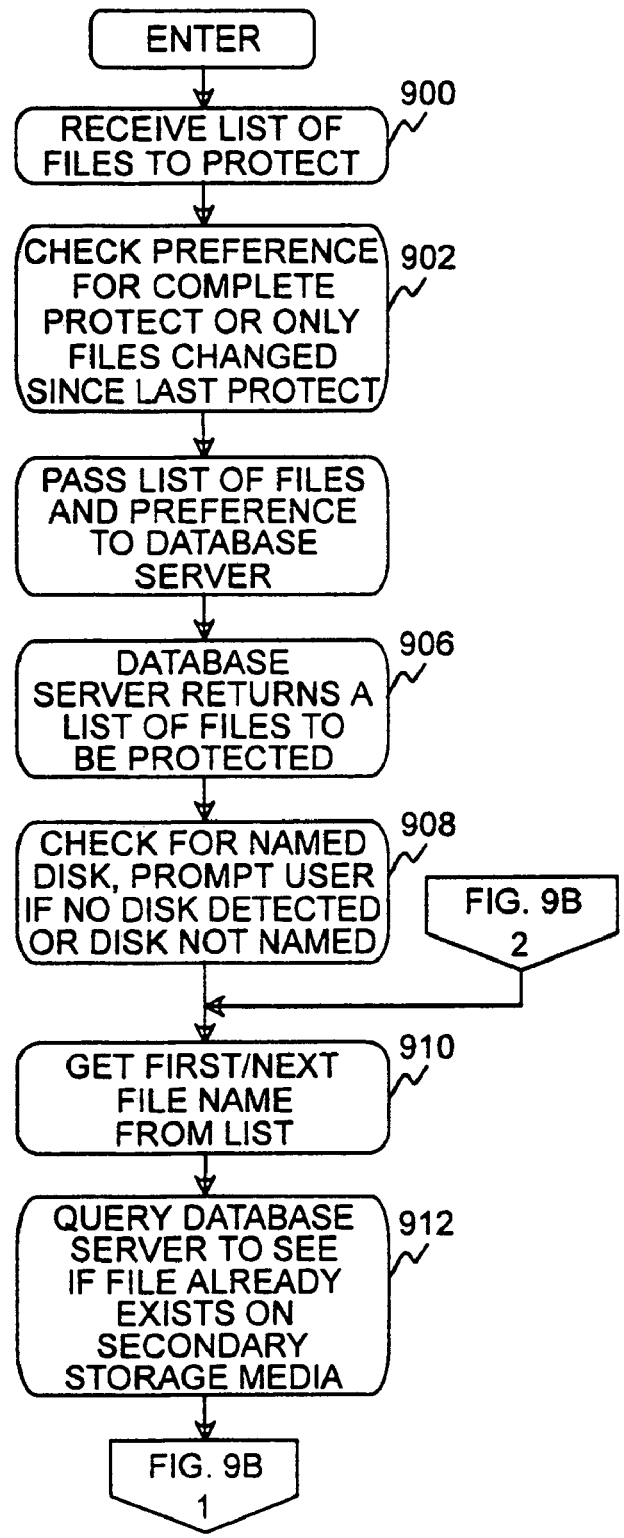
FIGS. 9A and 9B show a block diagram of the protect file component of the data protection system of the present invention.
Figure 9B:
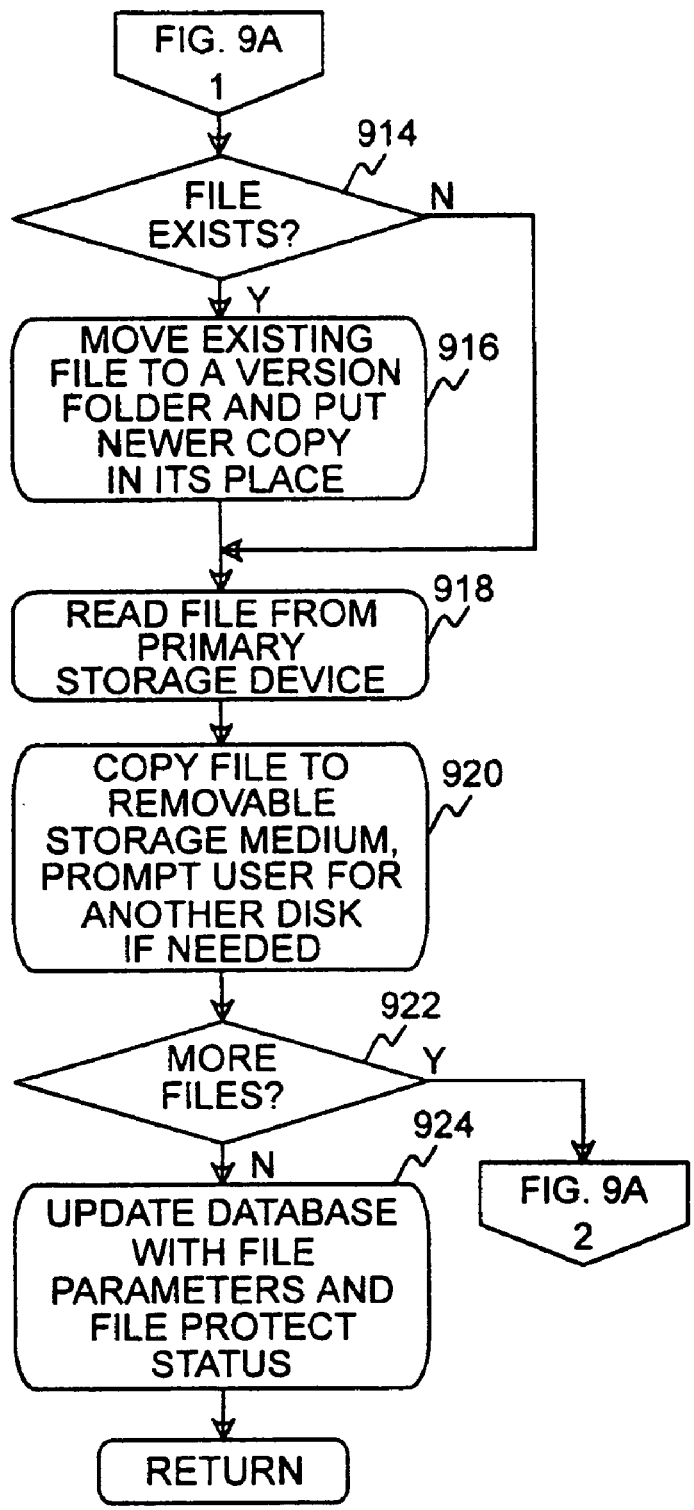

In step 804, after receiving the drop input or paste input in step 802, Shell Extension 204 invokes Protect File Component 240 (FIG. 2), passing the file names and paths from the data object dropped or pasted on Data Vault Folder Item 410, and calls FIGS. 9A and 9B. Upon returning from FIGS. 9A and 9B, step 806 determines if a next drag and drop input or copy and paste input on Data Vault Folder Item 410 is received and if so, control passes to step 802. If no further drag and drop input or copy and paste input is received on Data Vault Folder Item 410, control returns to Existing File Management Software 114.

FIGS. 9A and 9B show a block diagram of the protect file component of the data protection system of the present invention. Referring now to FIGS. 9A and 9B, in step 900 Protect File Component 240 (FIG. 2) receives the list of file names and paths from calling steps 612, 712, or 804. In step 902, Protect File Component 240 checks the preference in Protection List Editor Scheduler 226 (FIG. 2) to determine if all the files are to be protected, or only those files that have changed since the last protection session. In step 904 Protect File Component 240 passes the file names and paths and the preference to Database Server 258 (FIG. 2). In step 906 Database Server 258 processes the file names and paths and the preference, and returns a list of files and path names to be protected to Protect File Component 240.

In step 908 Protect File Component 240 checks to see if a Removable Storage Medium 124 properly named has been inserted into Secondary Storage Device 122 (FIG. 1) before the protection operation begins. If not, Protect File Component 240 prompts the user to insert a Removable Storage Medium 124. If the Removable Storage Medium 124 inserted has not been named, Protect File Component 240 prompts the user to name Removable Storage Medium 124.

In step 910, Protect File Component 240 gets the first file name and path from the protection list received from Database Server 258 in step 906. Protect File Component 240 in step 912 queries Database Server 258 to see if the file has already been protected on the named Removable Storage Medium 124 currently in Secondary Storage Device 122. If in step 914 it is determined that the file does not exist on the named Removable Storage Medium 124, then control passes to step 918. If in step 914 it is determined that the file does exist on named Removable Storage Medium 124, then in step 916 Protect File Component 240 moves the existing copy of the file into a version folder with a similar name, and will place the newer copy of the file in its place. This insures that the most recent copy of the file is where the user expects it.

In step 918 Protect File Component 240 reads the file from Primary Storage Device 112 (FIG. 1). In step 920 Protect File Component 240 copies the file to named Removable Storage Medium 124, prompting the user for another disk if necessary (disk is full). Step 922 determines if there are more files in the list. If there are more files, then control returns to step 910. If there are no more files to process in step 922, then in step 924 Protect File Component 240 notifies Database Server 258 of the final location of the files and the protection status of the files to be added to Database 318.

Figure 10:
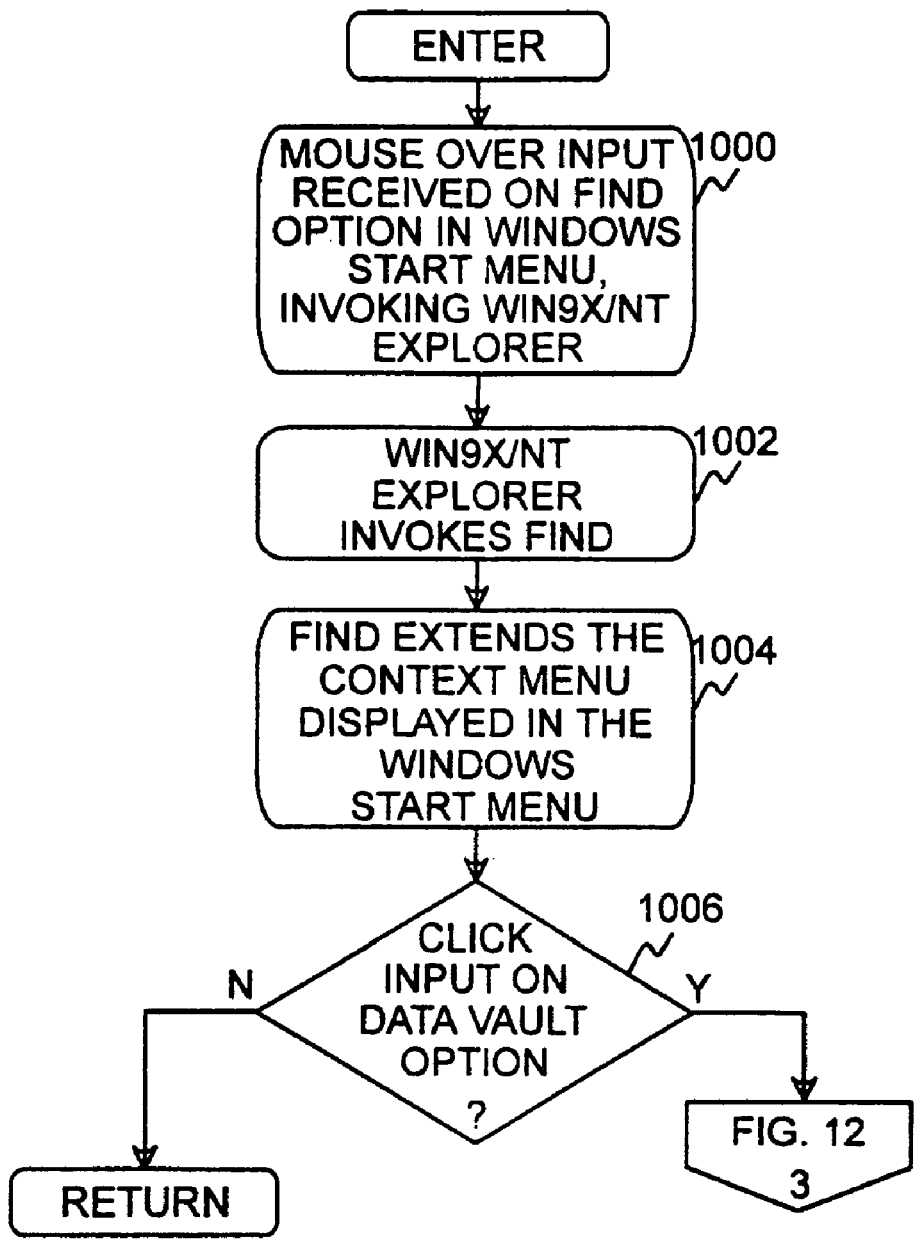
FIG. 10 shows a block diagram of retrieving files protected with the data protection system of the present invention by accessing the find component from the start menu.

FIG. 10 shows a block diagram of retrieving files protected with the data protection system of the present invention by accessing the find component from the Operating System Start Menu. Referring now to FIG. 10, click input has been received by Existing Operating System 118 (FIG. 1) on the Operating System Start Button, opening and displaying the Operating System Start Menu. In step 1000, mouse over input is received on the Find Option in the Operating System Start Menu, invoking Existing File Management Software 114 (FIG. 1). In step 1002 Existing File Management Software 114 invokes Find Component 208 (FIG. 2). In step 1004, Find Component 208 extends the context submenu that is displayed off of the Find Option in the Operating System Start Menu. Step 1006 determines if click input is received on the In Data Vault Option in the context submenu. If yes, then control passes to FIG. 12, step 1200. If not, control returns to Existing File Management Software 114 if any another context submenu item is selected.

Figure 11A:
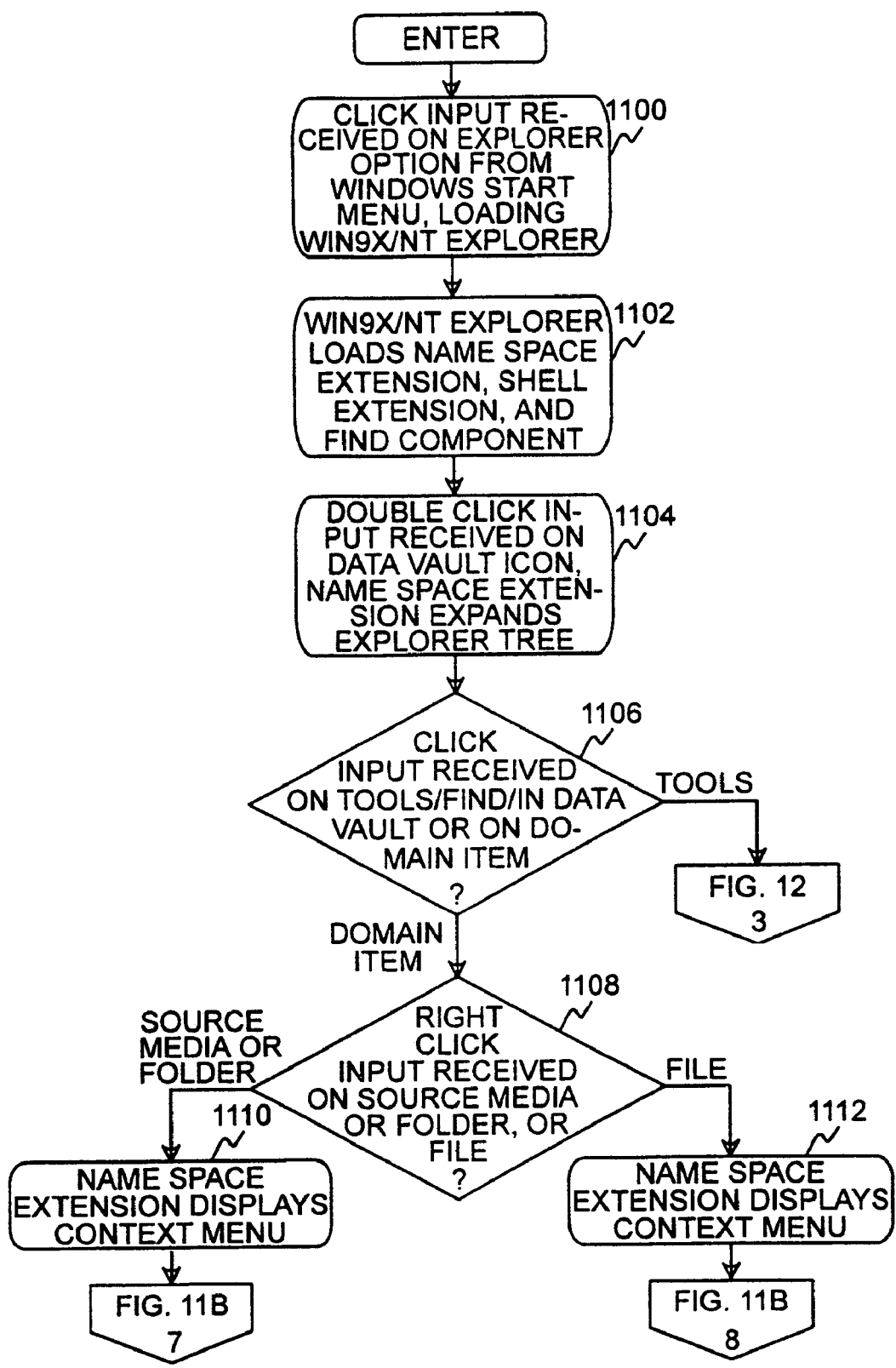
FIGS. 11A and 11B show a block diagram of retrieving files protected with the data protection system of the present invention by accessing the find component from within the file management software.
Figure 11B:
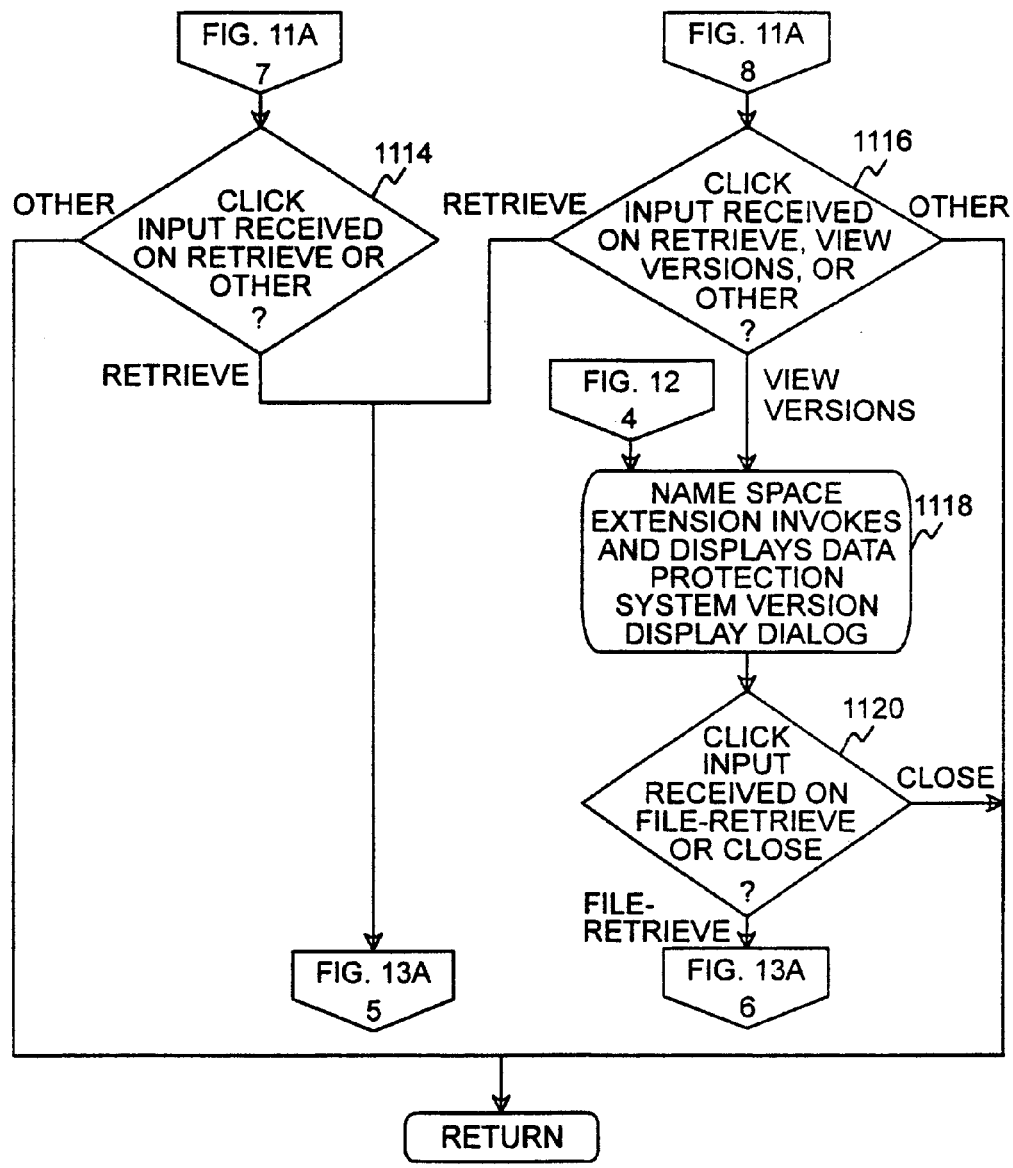

FIGS. 11A and 11B show a block diagram of retrieving files protected with the data protection system of the present invention by accessing the Find component from within Existing File Management Software 114. Referring now to FIGS. 11A and 11B, in step 1100, after click input has been received by Existing Operating System 118 (FIG. 1) on the Operating System Start Button, opening and displaying the Operating System Start Menu, click input is received on the File Management Option, loading Existing File Management Software 114 (FIG. 1). In step 1102 Existing File Management Software 114 loads Shell Extension 204, Name Space Extension 206, and Find Component 208 (FIG. 2). In step 1104, double click input is received on Data Vault Folder Item 410 (FIG. 4), causing Name Space Extension 206 to expand the Existing File Management Software 114 tree, as described in FIG. 5, to show Data Protection System Domain 420 (FIG. 4).

Step 1106 determines if click input is received selecting the Tools Option from the Frame Menu, the Find Option from the Tools Context Menu, and the In Data Vault Option from the Find Context Submenu, or, if double click input is received on an item within Data Protection System Domain 420. If input is received on Tools/Find/In Data Vault, then control transfers to FIG. 12, step 1200. If double click input is received on an item within Data Protection System Domain 420, then step 1108 determines if right click input is received on source media, such as C Drive or D Drive, or on a folder, or, on a file. If right click input is received on source media or a folder, then in step 1110 Name Space Extension 206 displays a context menu in Left Pane 404 (FIG. 4). Step 1114 then determines if input is received on the Retrieve Option in the context menu, or some other option. If input is received on the Retrieve Option, control transfers to FIG. 13A, step 1300. In step 1114, control returns to Existing File Management Software 114 if any another context submenu item is selected.

If in step 1108 right click input is received on a file, then in step 1112 Name Space Extension 206 displays a context menu in Right Pane 406 (FIG. 4). Step 1116 determines if input is received on the Retrieve Option, the View Versions Option, or some other option. If the input is received on the Retrieve Option in step 1116, then control transfers to FIG. 13A, step 1300. If in step 1116 input is received on the View Versions Option, then in step 1118 Name Space Extension 206 invokes and displays a Data Protection System Version Display Dialog Box. Step 1120 then determines if click input is received on a file and then on a Retrieve Button, or on the Close Button. If click input is received on a file and then on the Retrieve Button, control transfers to FIG. 13A, step 1302. If the click input in step 1120 is on the Close Button, then control returns to Existing File Management Software 114. In step 1116, control returns to Existing File Management Software 114 if any other option is selected.

Figure 12:
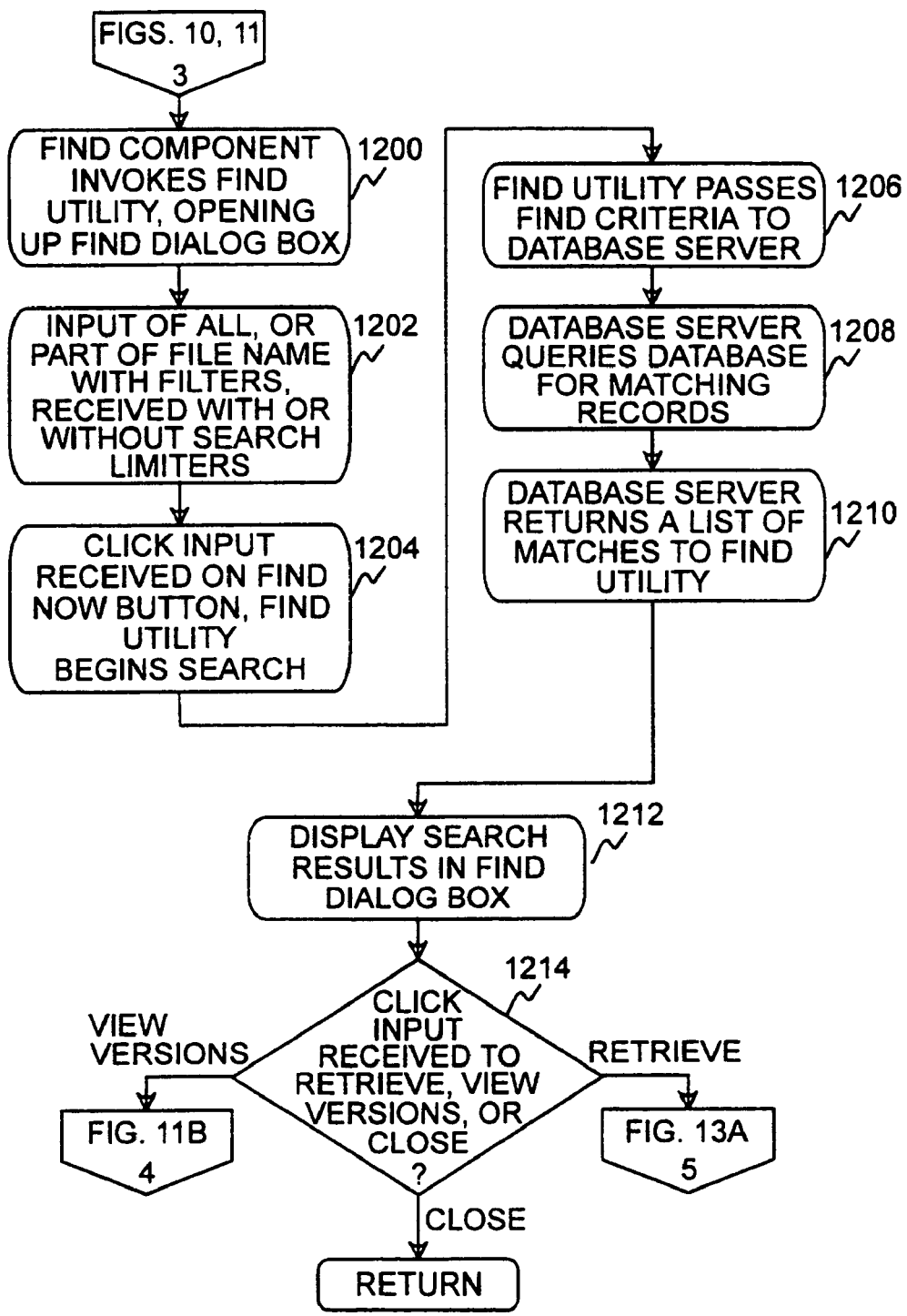
FIG. 12 shows a block diagram of the find component of the data protection system of the present invention.

FIG. 12 shows a block diagram of the find component of the data protection system of the present invention. Referring now to FIG. 12, FIG. 12 has been called from either step 1006 in FIG. 10 or from step 1106 in FIG. 11A. In step 1200 Find Component 208 invokes Find Utility 212 (FIG. 2), opening up and displaying a Find Dialog Box in Screen Display 402 (FIG. 4) having a tree view control of the Data Protection System Domain 420 which a user can browse. In step 1202 input of all, or part of a file name with filters, is received. The filters are wildcard characters that take the place of one or more letters or numbers to assist in finding a file whose complete name is not known. Also, search input limiters may be received to limit the search to specific Removable Storage Medium 124, drives, or folders, or, files protected during a specified period of time.

In step 1204 click input is received on the Find Now Button causing Find Utility 212 to begin the search. Find Utility 212 in step 1206 passes the find criteria along with the currently highlighted folder ID from the tree view control to Database Server 258 (FIG. 2). In step 1208 Database Server 258 queries Database 318 (FIG. 3) for records that match the criteria passed, and in step 1210 returns a list of matches to Find Utility 212. In step 1212 the results of the search are displayed in the Find Dialog Box. Step 1214 determines if click input is received on a Retrieve Option or a View Versions Option, made available from a pull down frame menu or a context menu made available by clicking on a file displayed in the Find Dialog Box, or input to close the Find Dialog Box. If click input is received on a View Versions Option, control transfers to FIG. 11B, step 1118. If click input is received on a Retrieve Option, control transfers to FIG. 13A, step 1300. If click input is received to close the Find Dialog Box, the Find Dialog Box is closed and control returns to Existing File Management Software 114.

Figure 13A:
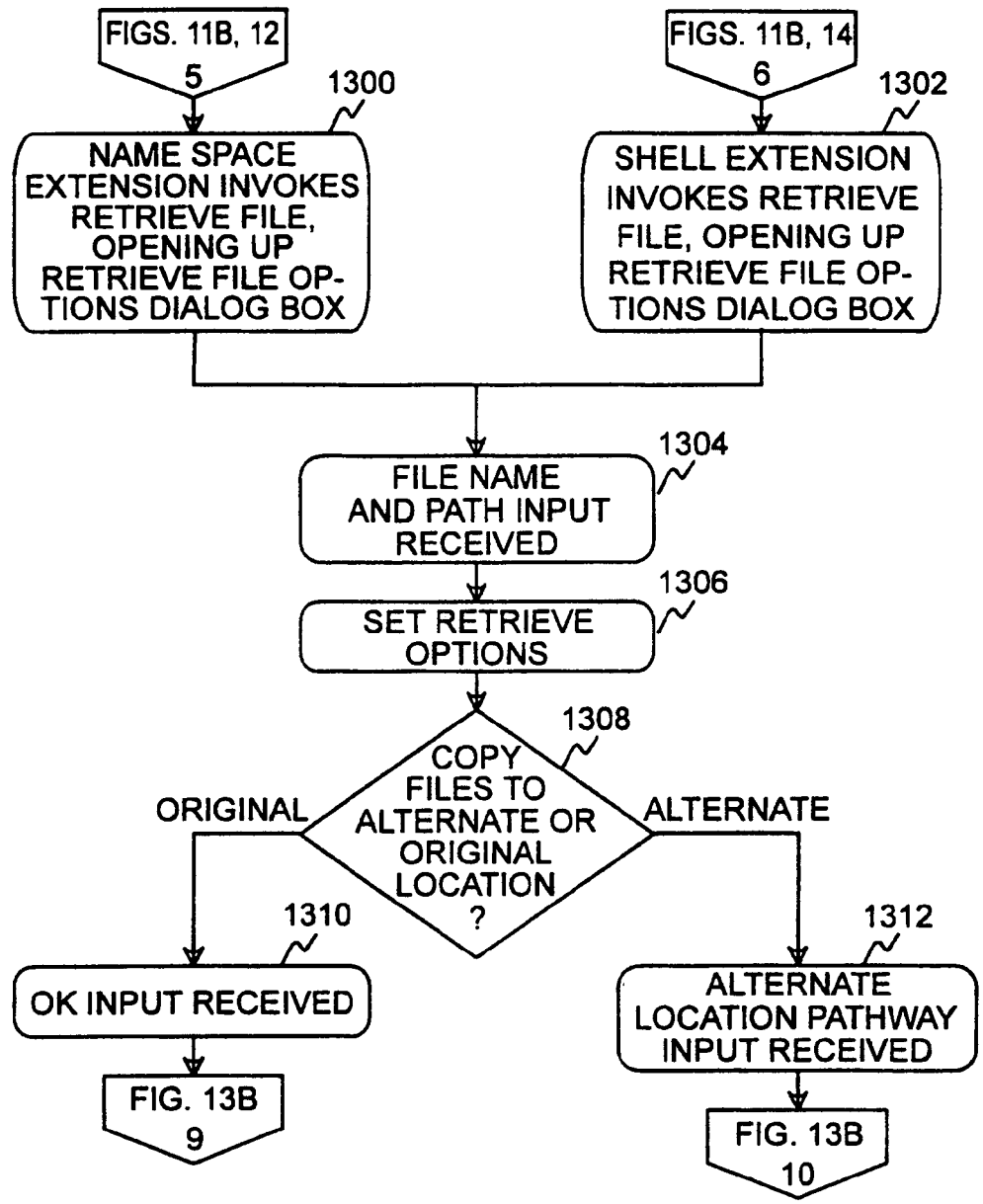
FIGS. 13A and 13B show a block diagram of the retrieve file component of the data protection system of the present invention.
Figure 13B:
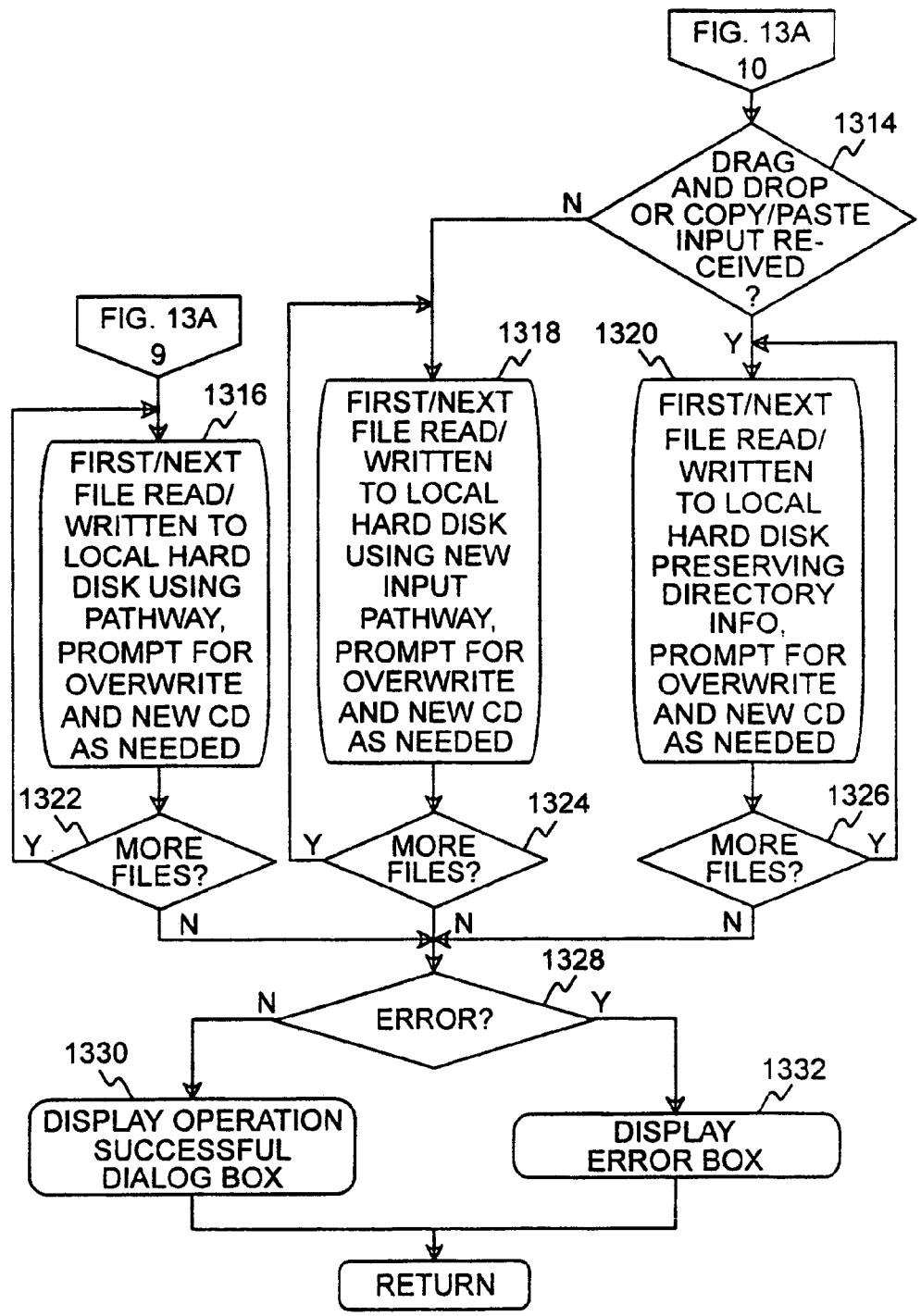

FIGS. 13A and 13B show a block diagram of the retrieve file component of the data protection system of the present invention. Referring now to FIGS. 13A and 13B, entry is made from either step 1300 or step 1302. In step 1300, which has been called from either step 1114 or step 1116 in FIG. 11A, or from step 1208 in FIG. 12, Name Space Extension 206 invokes Retrieve File Component 248 (FIG. 2), opening up a Retrieve File Options Dialog Box. In step 1302, which has been called from step 1120 in FIG. 11B, Shell Extension 204 (FIG. 2) invokes Retrieve File Component 248, opening up the Retrieve File Options Dialog Box.

In step 1304, a list of the file name or names selected for retrieval, and their path or paths, are received from the figure that called FIGS. 13A and 13B. In step 1306 input in the Retrieve File Options Dialog Box are received by Retrieve File Component 248. The options include 'Ask Before Overwriting Files', 'Include Subdirectories', and 'Copy File to an Alternate Location'.

Step 1308 determines if the file or files selected for retrieval are to be copied to the original location from where they were protected, or to an alternate location, based on the input in step 1306. If the file or files are to be copied to their original location(s), then control passes to step 1310 where input is received on an OK Button to begin the copying process. In step 1316, Retrieve File Component 248 gets the first file name and path and reads the file from the proper Removable Storage Medium 124 that has been loaded into Secondary Storage Device 122 (FIG. 1). If the proper Removable Storage Medium 124 is not in Secondary Storage Device 122, Retrieve File Component 248 will display an Insert Disk Dialog Box in Screen Display 402 (FIG. 4), prompting the user to insert the proper Removable Storage Medium 124 into Secondary Storage Device 122. If the Ask Before Overwriting File Option was selected in step 1306, Retrieve File Component 248 will display a Confirm Replace File Dialog Box in Screen Display 402, prompting the user for input to authorize replacement or to cancel replacement. The file is then written to Primary Storage Device 112 (FIG. 1) at the location specified by the path. While copying of the file is in progress, Retrieve File Component 248 displays a Copying Files Dialog Box in Screen Display 402 which shows the progress of the copying process. Step 1322 determines if there are more files in the list to be retrieved. If yes, control returns to step 1316. If there are no more files in the list, control passes to step 1328.

If step 1308 determines that the file or files selected for retrieval are to be copied to an alternate location, based on the input in step 1306, then in step 1312 the alternate location path input is received by Retrieve File Component 248. Step 1314 determines if drag and drop input, or copy and paste input, of a file or group of files is received. If the answer is no, indicating that the retrieved files are to be removed from their original folders and subfolders and placed in the alternate location, then in step 1318 Retrieve File Component 248 gets the first file name and path and reads the file from the proper Removable Storage Medium 124 that has been loaded into Secondary Storage Device 122. If the proper Removable Storage Medium 124 is not in Secondary Storage Device 122, Retrieve File Component 248 will display an Insert Disk Dialog Box in Screen Display 402, prompting the user to insert the proper Removable Storage Medium 124 into Secondary Storage Device 122. If the Ask Before Overwriting File Option was selected in step 1306, Retrieve File Component 248 will display a Confirm Replace File Dialog Box in Screen Display 402, prompting the user for input to authorize replacement or to cancel replacement. The file is then written to Primary Storage Device 112 (FIG. 1) according to the alternate location path specified. While copying of the file is in progress, Retrieve File Component 248 displays a Copying Files Dialog Box in Screen Display 402 which shows the progress of the copying process. Step 1324 determines if there are more files in the list to be retrieved. If yes, control returns to step 1318. If not, control passes to step 1328.

If step 1314 determines that drag and drop input, or copy and paste input, of a file or group of files has been received, indicating that the original directory information is to be retained, then in step 1320 Retrieve File Component 248 gets the first file name and path and reads the file from the proper Removable Storage Medium 124 that has been loaded into Secondary Storage Device 122. If the proper Removable Storage Medium 124 is not in Secondary Storage Device 122, Retrieve File Component 248 will display an Insert Disk Dialog Box in Screen Display 402, prompting the user to insert the proper Removable Storage Medium 124 into Secondary Storage Device 122. If the Ask Before Overwriting File Option was selected in step 1306, Retrieve File Component 248 will display a Confirm Replace File Dialog Box in Screen Display 402, prompting the user for input to authorize replacement or cancel. The file is then written to Primary Storage Device 112 at the location selected by the drop or paste input. While copying of the file is in progress, Retrieve File Component 248 displays a Copying Files Dialog Box in Screen Display 402 which shows the progress of the copying process. Step 1324 determines if there are more files in the group of files selected via the drag and drop or copy and paste input. If yes, control returns to step 1320. If not, control passes to step 1328.

In step 1328 Retrieve File Component 248 determines if one or more errors occurred in the copying process. If yes, then in step 1332, Retrieve File Component 248 displays an Errors Dialog Box in Screen Display 402. Errors are kept in a log which may be accessed from the Errors Dialog Box. After closing the Errors Dialog Box, control returns to Existing File Management Software 114. If there were no errors detected in step 1328, Retrieve File Component 248 displays an Operation Successful Dialog Box in Screen Display 402. After closing the Operation Successful Dialog Box, control returns to Existing File Management Software 114.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A method of providing file management of backup data stored on one or more removable storage media in a system, comprising:

displaying, in a file management display output screen, a hierarchical tree structure representing content of a removable storage medium, the content including backup copies of data on a primary storage medium of the system, wherein displaying the hierarchical tree structure in the file management display output screen is performed while the removable storage medium is off-line, wherein the off-line removable storage medium is not inserted in a storage device of the system;

changing the display of the hierarchical tree structure in the file management display output screen in response to receipt of user selection of an item in the displayed hierarchical tree structure while the removable storage medium is off-line;

in response to selection of an option indicating additional data to backup, prompting a user to insert the removable storage medium the storage device if it is detected that the removable storage medium is not inserted in the storage device; and copying the additional data to the removable storage medium after the removable storage medium has been inserted in the storage device.

2. The method of claim 1, wherein displaying the hierarchical tree structure while the removable storage medium is off-line comprises:

displaying a first folder item representing a domain corresponding to the backup copies of data in the file management display output screen.

3. The method of claim 1, further comprising:

displaying, in the file management display output screen, a second hierarchical tree structure representing content of a second removable storage medium that is off-line, the content of the second removable storage medium including backup copies of data on the primary storage medium; and changing the display of the second hierarchical tree structure in response to user selection of an item in the displayed second hierarchical tree structure while the second removable storage medium is off-line.

4. The method of claim 3, further comprising displaying a first folder item representing a domain corresponding to the backup copies of data on the removable storage media.

5. The method of claim 4, further comprising expanding additional folder items under the first folder item in response to user selection of the first folder item while the removable storage media are off-line.

6. The method of claim 1, further comprising displaying, in the file management display output screen, a second hierarchical tree structure of content of the primary storage medium.

7. A method of providing file management backup data stored on one or more removable storage media in a system comprising:

displaying, in a file management display output screen, a hierarchical tree structure representing content of a removable storage medium the content including backup copies of data on a primary storage medium of the system, wherein displaying the hierarchical tree structure in the file management display output screen is performed while the removable storage medium is off-line wherein the off-line removable storage medium is not inserted in a storage device of the system;

changing the display of the hierarchical tree structure in the file management display output screen in response to receipt of user selection of an item in the displayed hierarchical tree structure while the removable storage medium is off-line, wherein displaying the hierarchical tree structure while the removable storage medium is off-line comprises displaying a first folder item representing a domain corresponding to the backup copies of data in the file management display output screen, and wherein changing the display of the hierarchical tree structure comprises:

expanding additional folder items under the first folder item in response to receiving user input selecting the first folder item while the removable storage medium is off-line.

8. A method of providing file management of backup data stored on one or more removable storage media in a system comprising:

displaying, in a file management display output screen, a hierarchical tree structure representing content of a removable storage medium, the content including backup copies of data on a primary storage medium of the system, wherein displaying the hierarchical tree structure in the file management display output screen is performed while the removable storage medium is off-line, wherein the off-line removable storage medium is not inserted in a storage device of the system;

changing the display of the hierarchical tree structure in the file management display output screen in response to receipt of user selection of an item in the displayed hierarchical tree structure while the removable storage medium is off-line;

displaying, in the file management display output screen, a second hierarchical tree structure of content of the primary storage medium;

receiving user input indicating copying of an item of the second hierarchical tree structure to an item of the hierarchical tree structure representing content of the removable storage medium; and in response to the user input indicating the copying, causing a backup operation to be performed of data from the primary storage medium to the removable storage medium when the removable storage medium is inserted in the storage device.

9. A system comprising:

a primary storage medium;

a storage device to receive a removable storage medium;

a display to present a file management display output screen;

a processor; and software executable on the processor to:

display, in the file management display output screen, a hierarchical tree structure of backup data contained on the removable storage medium while the removable storage medium is not loaded in the storage device, wherein the backup data on the removable storage medium includes backup data of data on the primary storage medium, change the display of the hierarchical tree structure in the file management display output screen in response to receipt of user selection of items in the displayed hierarchical tree structure while the removable storage'medium is not loaded in the storage device;

in response to selection of an option indicating additional data to backup, prompt a user to insert the removable medium into the storage device if it is detected that the removable storage medium is not inserted in the storage device; and copy the additional data to the removable storage medium after the removable storage medium has been inserted in the storage device.

10. The system of claim 9, the primary storage medium to store a database relating to backup data contained on the removable storage medium, wherein the software is executable to display the hierarchical tree structure of content of the removable storage medium based on the database.

11. The system of claim 10, wherein the database contains records to track information about the backup data on the removable storage medium.

12. The system of claim 11, wherein the backup data contains files, and the tracking information includes source directory and path of each file, a name of the removable storage medium, and file characteristics.

13. The system of claim 9, wherein the software is executable to further:
display, in the file management display output screen, a second hierarchical tree structure of backup data on a second removable storage medium that is not loaded in the storage device, and
change the display of the second hierarchical tree structure in response to user input while the second removable storage medium is not loaded in the drive.

14. The system of claim 13, wherein the software is executable to further:
display a third hierarchical tree structure of content of the primary storage medium in the file management display output screen.

15. A system comprising:
a primary storage medium;
a storage device to receive a removable storage medium;
a display to present a file management display output screen;
a processor; and
software executable on the processor to:
display, in the file management display output screen, a hierarchical tree structure of backup data contained on the removable storage medium while the removable storage medium is not loaded in the storage device, wherein the backup data on the removable storage medium includes backup data of data on the primary storage medium,
change the display of the hierarchical tree structure in the file management display output screen in response to receipt of user selection of items in the displayed hierarchical tree structure while the removable storage medium is not loaded in the storage device,
display a second hierarchical tree structure of content of the primary storage medium in the file management display output screen,
receive user input indicating copying of a first item from the second hierarchical tree structure of content of the primary storage medium to a second item in the hierarchical tree structure of the removable storage medium, and
in response to user input indicating the copying, perform a backup operation of data on the primary storage medium corresponding to the first item to the removable storage medium when the removable storage medium is loaded in the storage device.

* * * * *

UNITED STATES PATENT AND TRADEMARK OFFICE
CERTIFICATE OF CORRECTION

PATENT NO. : 7,809,756 B2
APPLICATION NO. : 10/860255
DATED : October 5, 2010
INVENTOR(S) : Rock D. Barney et al.

Page 1 of 1

It is certified that error appears in the above-identified patent and that said Letters Patent is hereby corrected as shown below:

In column 19, line 8, in Claim 1, after "medium" insert -- into --.

In column 19, line 44, in Claim 7, after "management" insert -- of --.

In column 19, line 45, in Claim 7, delete "system" and insert -- system, --, therefor.

In column 19, line 49, in Claim 7, delete "medium" and insert -- medium, --, therefor.

In column 19, lines 53-54, in Claim 7, delete "off-line" and insert -- off-line, --, therefor.

In column 20, line 6, in Claim 8, delete "system" and insert -- system, --, therefor.

In column 20, line 54, in Claim 9, delete "storage'medium" and insert -- storage medium --, therefor.

In column 20, line 57, in Claim 9, after "removable" insert -- storage --.

Signed and Sealed this
Twelfth Day of April, 2011

David J. Kappos
*Director of the United States Patent and Trademark Office*